(12) United States Patent
Gorrell et al.

(10) Patent No.: US 7,560,716 B2
(45) Date of Patent: Jul. 14, 2009

(54) FREE ELECTRON OSCILLATOR

(75) Inventors: Jonathan Gorrell, Gainesville, FL (US);
Mark Davidson, Florahome, FL (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 251 days.

(21) Appl. No.: 11/525,151

(22) Filed: Sep. 22, 2006

(65) Prior Publication Data

US 2008/0073590 A1    Mar. 27, 2008

(51) Int. Cl.
*G21G 4/00* (2006.01)
*G01J 1/00* (2006.01)
*H01H 7/00* (2006.01)
*H01H 2/00* (2006.01)

(52) U.S. Cl. .............. 250/493.1; 250/504 R; 315/500; 315/505; 315/506; 372/2; 372/26; 331/79; 331/54

(58) Field of Classification Search ............. 250/493.1, 250/492.3, 495.1, 504 R, 396 R; 372/2, 4, 372/5, 9, 20, 26, 74, 99, 102, 108; 315/3, 315/3.6, 14, 15, 364, 500, 505, 506; 331/79, 331/80, 81, 54, 55
See application file for complete search history.

(56) References Cited

U.S. PATENT DOCUMENTS

| | | | |
|---|---|---|---|
| 2,027,017 A * | 1/1936 | Brett | 331/80 |
| 2,397,411 A * | 3/1946 | Dow | 331/72 |
| 2,397,905 A | 4/1946 | Rockwell et al. | |
| 2,431,396 A | 11/1947 | Hansell | |
| 2,634,372 A | 4/1953 | Salisbury | |
| 2,944,183 A | 7/1960 | Drexler | |
| 2,966,611 A | 12/1960 | Sandstrom | |
| 3,231,779 A | 1/1966 | White | |
| 3,297,905 A | 1/1967 | Fiedor et al. | |
| 3,315,117 A | 4/1967 | Udelson | |
| 3,387,169 A | 6/1968 | Farney | |
| 3,543,147 A | 11/1970 | Kovarik | |
| 3,546,524 A | 12/1970 | Stark | |
| 3,560,694 A | 2/1971 | White | |

(Continued)

FOREIGN PATENT DOCUMENTS

EP    0237559 B1    12/1991

(Continued)

OTHER PUBLICATIONS

International Search Report and Written Opinion mailed Nov. 23, 2007 in International Application No. PCT/US2006/022786.

(Continued)

*Primary Examiner*—Bernard E Souw
(74) *Attorney, Agent, or Firm*—Davidson Berquist Jackson & Gowdey LLP

(57) ABSTRACT

A beam of charged particles (e.g., an electron beam) from a charged particle source can be selectively applied to a pair of electrodes. For example, the charged particles can be electrons that are directed toward a first electrode when the charge difference between the electrodes is in one state and directed toward the second electrode when the charge difference between the electrodes is in another state. The electrodes are configured so that the beam of charged particles oscillates between the first and second electrodes.

10 Claims, 24 Drawing Sheets

U.S. PATENT DOCUMENTS

| | | | |
|---|---|---|---|
| 3,586,899 A | 6/1971 | Fleisher | |
| 3,886,399 A | 5/1975 | Symons | |
| 3,923,568 A | 12/1975 | Bersin | |
| 3,989,347 A | 11/1976 | Eschler | |
| 4,053,845 A | 10/1977 | Gould | |
| 4,282,436 A | 8/1981 | Kapetanakos | |
| 4,450,554 A | 5/1984 | Steensma et al. | |
| 4,528,659 A | 7/1985 | Jones, Jr. | |
| 4,589,107 A | 5/1986 | Middleton et al. | |
| 4,598,397 A | 7/1986 | Nelson et al. | |
| 4,630,262 A | 12/1986 | Callens et al. | |
| 4,652,703 A | 3/1987 | Lu et al. | |
| 4,661,783 A | 4/1987 | Gover et al. | |
| 4,704,583 A | 11/1987 | Gould | |
| 4,712,042 A | 12/1987 | Hamm | |
| 4,713,581 A | 12/1987 | Haimson | |
| 4,727,550 A | 2/1988 | Chang et al. | |
| 4,740,963 A | 4/1988 | Eckley | |
| 4,740,973 A | 4/1988 | Madey | |
| 4,761,059 A | 8/1988 | Yeh et al. | |
| 4,782,485 A | 11/1988 | Gollub | |
| 4,789,945 A | 12/1988 | Niijima | |
| 4,806,859 A | 2/1989 | Hetrick | |
| 4,809,271 A | 2/1989 | Kondo et al. | |
| 4,813,040 A | 3/1989 | Futato | |
| 4,819,228 A | 4/1989 | Baran et al. | |
| 4,829,527 A | 5/1989 | Wortman et al. | |
| 4,838,021 A | 6/1989 | Beattie | |
| 4,841,538 A | 6/1989 | Yanabu et al. | |
| 4,864,131 A | 9/1989 | Rich et al. | |
| 4,866,704 A | 9/1989 | Bergman | |
| 4,866,732 A | 9/1989 | Carey et al. | |
| 4,873,715 A | 10/1989 | Shibata | |
| 4,887,265 A | 12/1989 | Felix | |
| 4,890,282 A | 12/1989 | Lambert et al. | |
| 4,898,022 A | 2/1990 | Yumoto et al. | |
| 4,912,705 A | 3/1990 | Paneth et al. | |
| 4,932,022 A | 6/1990 | Keeney et al. | |
| 4,981,371 A | 1/1991 | Gurak et al. | |
| 5,023,563 A | 6/1991 | Harvey et al. | |
| 5,036,513 A | 7/1991 | Greenblatt | |
| 5,048,045 A * | 9/1991 | Noda et al. | 372/86 |
| 5,065,425 A | 11/1991 | Lecomte et al. | |
| 5,113,141 A | 5/1992 | Swenson | |
| 5,121,385 A | 6/1992 | Tominaga et al. | |
| 5,127,001 A | 6/1992 | Steagall et al. | |
| 5,128,729 A | 7/1992 | Alonas et al. | |
| 5,130,985 A | 7/1992 | Kondo et al. | |
| 5,150,410 A | 9/1992 | Bertrand | |
| 5,155,726 A | 10/1992 | Spinney et al. | |
| 5,157,000 A | 10/1992 | Elkind et al. | |
| 5,185,073 A | 2/1993 | Bindra | |
| 5,187,591 A | 2/1993 | Guy et al. | |
| 5,199,918 A | 4/1993 | Kumar | |
| 5,214,650 A | 5/1993 | Renner et al. | |
| 5,233,623 A | 8/1993 | Chang | |
| 5,235,248 A | 8/1993 | Clark et al. | |
| 5,262,656 A | 11/1993 | Blondeau et al. | |
| 5,263,043 A | 11/1993 | Walsh | |
| 5,268,693 A | 12/1993 | Walsh | |
| 5,268,788 A | 12/1993 | Fox et al. | |
| 5,282,197 A | 1/1994 | Kreitzer | |
| 5,283,819 A | 2/1994 | Glick et al. | |
| 5,293,175 A | 3/1994 | Hemmie et al. | |
| 5,302,240 A | 4/1994 | Hori et al. | |
| 5,305,312 A | 4/1994 | Fornek et al. | |
| 5,341,374 A | 8/1994 | Lewen et al. | |
| 5,446,814 A | 8/1995 | Kuo et al. | |
| 5,504,341 A | 4/1996 | Glavish | |
| 5,578,909 A | 11/1996 | Billen | |
| 5,604,352 A | 2/1997 | Schuetz | |
| 5,608,263 A | 3/1997 | Drayton et al. | |
| 5,663,971 A | 9/1997 | Carlsten | |
| 5,666,020 A | 9/1997 | Takemura | |
| 5,668,368 A | 9/1997 | Sakai et al. | |
| 5,705,443 A | 1/1998 | Stauf et al. | |
| 5,737,458 A | 4/1998 | Wojnarowski et al. | |
| 5,744,919 A | 4/1998 | Mishin et al. | |
| 5,757,009 A | 5/1998 | Walstrom | |
| 5,767,013 A | 6/1998 | Park | |
| 5,780,970 A | 7/1998 | Singh et al. | |
| 5,790,585 A | 8/1998 | Walsh | |
| 5,811,943 A | 9/1998 | Mishin et al. | |
| 5,821,836 A | 10/1998 | Katehi et al. | |
| 5,821,902 A | 10/1998 | Keen | |
| 5,825,140 A | 10/1998 | Fujisawa | |
| 5,831,270 A | 11/1998 | Nakasuji | |
| 5,847,745 A | 12/1998 | Shimizu et al. | |
| 5,889,449 A | 3/1999 | Fiedziuszko | |
| 5,889,797 A | 3/1999 | Nguyen | |
| 5,902,489 A | 5/1999 | Yasuda et al. | |
| 5,963,857 A | 10/1999 | Greywall | |
| 6,005,347 A | 12/1999 | Lee | |
| 6,008,496 A | 12/1999 | Winefordner et al. | |
| 6,040,625 A | 3/2000 | Ip | |
| 6,060,833 A | 5/2000 | Velazco | |
| 6,080,529 A | 6/2000 | Ye et al. | |
| 6,139,760 A | 10/2000 | Shim et al. | |
| 6,180,415 B1 | 1/2001 | Schultz et al. | |
| 6,195,199 B1 | 2/2001 | Yamada | |
| 6,222,866 B1 | 4/2001 | Seko | |
| 6,278,239 B1 | 8/2001 | Caporaso et al. | |
| 6,281,769 B1 | 8/2001 | Fiedziuszko | |
| 6,297,511 B1 | 10/2001 | Syllaios et al. | |
| 6,301,041 B1 | 10/2001 | Yamada | |
| 6,316,876 B1 | 11/2001 | Tanabe | |
| 6,338,968 B1 | 1/2002 | Hefti | |
| 6,370,306 B1 | 4/2002 | Sato et al. | |
| 6,373,194 B1 | 4/2002 | Small | |
| 6,376,258 B2 | 4/2002 | Hefti | |
| 6,407,516 B1 | 6/2002 | Victor | |
| 6,441,298 B1 | 8/2002 | Thio | |
| 6,448,850 B1 | 9/2002 | Yamada | |
| 6,453,087 B2 | 9/2002 | Frish et al. | |
| 6,470,198 B1 | 10/2002 | Kintaka et al. | |
| 6,504,303 B2 | 1/2003 | Small | |
| 6,525,477 B2 | 2/2003 | Small | |
| 6,534,766 B2 | 3/2003 | Abe et al. | |
| 6,545,425 B2 | 4/2003 | Victor | |
| 6,552,320 B1 | 4/2003 | Pan | |
| 6,577,040 B2 | 6/2003 | Nguyen | |
| 6,580,075 B2 | 6/2003 | Kametani et al. | |
| 6,603,781 B1 | 8/2003 | Stinson et al. | |
| 6,603,915 B2 | 8/2003 | Glebov et al. | |
| 6,624,916 B1 | 9/2003 | Green et al. | |
| 6,636,185 B1 | 10/2003 | Spitzer et al. | |
| 6,636,534 B2 | 10/2003 | Madey et al. | |
| 6,636,653 B2 | 10/2003 | Miracky et al. | |
| 6,640,023 B2 | 10/2003 | Miller et al. | |
| 6,642,907 B2 | 11/2003 | Hamada et al. | |
| 6,687,034 B2 | 2/2004 | Wine et al. | |
| 6,724,486 B1 | 4/2004 | Shull et al. | |
| 6,738,176 B2 | 5/2004 | Rabinowitz et al. | |
| 6,741,781 B2 | 5/2004 | Furuyama | |
| 6,782,205 B2 | 8/2004 | Trisnadi et al. | |
| 6,791,438 B2 | 9/2004 | Takahashi et al. | |
| 6,800,877 B2 | 10/2004 | Victor et al. | |
| 6,801,002 B2 | 10/2004 | Victor et al. | |
| 6,819,432 B2 | 11/2004 | Pepper et al. | |
| 6,829,286 B1 | 12/2004 | Guilfoyle et al. | |
| 6,834,152 B2 | 12/2004 | Gunn et al. | |
| 6,870,438 B1 | 3/2005 | Shino et al. | |
| 6,871,025 B2 | 3/2005 | Maleki et al. | |
| 6,885,262 B2 | 4/2005 | Nishimura et al. | |

| Patent No. | Date | Name |
|---|---|---|
| 6,900,447 B2 | 5/2005 | Gerlach et al. |
| 6,909,092 B2 | 6/2005 | Nagahama |
| 6,909,104 B1 | 6/2005 | Koops |
| 6,924,920 B2 | 8/2005 | Zhilkov |
| 6,936,981 B2 | 8/2005 | Gesley |
| 6,943,650 B2 | 9/2005 | Ramprasad et al. |
| 6,944,369 B2 | 9/2005 | Deliwala |
| 6,952,492 B2 | 10/2005 | Tanaka et al. |
| 6,953,291 B2 | 10/2005 | Liu |
| 6,954,515 B2 | 10/2005 | Bjorkholm et al. |
| 6,965,284 B2 | 11/2005 | Maekawa et al. |
| 6,965,625 B2 | 11/2005 | Mross et al. |
| 6,972,439 B1 | 12/2005 | Kim et al. |
| 6,995,406 B2 | 2/2006 | Tojo et al. |
| 7,010,183 B2 | 3/2006 | Estes et al. |
| 7,064,500 B2 | 6/2006 | Victor et al. |
| 7,068,948 B2 | 6/2006 | Wei et al. |
| 7,092,588 B2 | 8/2006 | Kondo |
| 7,092,603 B2 | 8/2006 | Glebov et al. |
| 7,122,978 B2 | 10/2006 | Nakanishi et al. |
| 7,130,102 B2 | 10/2006 | Rabinowitz |
| 7,177,515 B2 | 2/2007 | Estes et al. |
| 7,230,201 B1 | 6/2007 | Miley et al. |
| 7,253,426 B2 * | 8/2007 | Gorrell et al. ............... 250/200 |
| 7,267,459 B2 | 9/2007 | Matheson |
| 7,267,461 B2 | 9/2007 | Kan et al. |
| 7,309,953 B2 | 12/2007 | Tiberi et al. |
| 7,342,441 B2 | 3/2008 | Gorrell et al. |
| 7,362,972 B2 | 4/2008 | Yavor et al. |
| 7,375,631 B2 | 5/2008 | Moskowitz et al. |
| 7,436,177 B2 | 10/2008 | Gorrell et al. |
| 7,442,940 B2 | 10/2008 | Gorrell et al. |
| 7,443,358 B2 | 10/2008 | Gorrell et al. |
| 7,470,920 B2 | 12/2008 | Gorrell et al. |
| 7,473,917 B2 | 1/2009 | Singh |
| 2001/0025925 A1 | 10/2001 | Abe et al. |
| 2002/0036121 A1 | 3/2002 | Ball et al. |
| 2002/0036264 A1 | 3/2002 | Nakasuji et al. |
| 2002/0053638 A1 | 5/2002 | Winkler et al. |
| 2002/0068018 A1 | 6/2002 | Pepper et al. |
| 2002/0070671 A1 | 6/2002 | Small |
| 2002/0071457 A1 | 6/2002 | Hogan |
| 2002/0190200 A1 * | 12/2002 | Zajfman et al. ............. 250/287 |
| 2002/0191650 A1 | 12/2002 | Madey et al. |
| 2003/0010979 A1 | 1/2003 | Pardo |
| 2003/0012925 A1 | 1/2003 | Gorrell |
| 2003/0016412 A1 | 1/2003 | Small |
| 2003/0016421 A1 | 1/2003 | Small |
| 2003/0034535 A1 | 2/2003 | Barenburu et al. |
| 2003/0103150 A1 | 6/2003 | Catrysse et al. |
| 2003/0106998 A1 | 6/2003 | Colbert et al. |
| 2003/0158474 A1 | 8/2003 | Scherer et al. |
| 2003/0164947 A1 | 9/2003 | Vaupel |
| 2003/0206708 A1 | 11/2003 | Estes et al. |
| 2003/0214695 A1 | 11/2003 | Abramson et al. |
| 2004/0061053 A1 | 4/2004 | Taniguchi et al. |
| 2004/0080285 A1 | 4/2004 | Victor et al. |
| 2004/0085159 A1 | 5/2004 | Kubena et al. |
| 2004/0092104 A1 | 5/2004 | Gunn, III et al. |
| 2004/0108471 A1 | 6/2004 | Luo et al. |
| 2004/0108473 A1 | 6/2004 | Melnychuk et al. |
| 2004/0136715 A1 | 7/2004 | Kondo |
| 2004/0150991 A1 | 8/2004 | Ouderkirk et al. |
| 2004/0171272 A1 | 9/2004 | Jin et al. |
| 2004/0180244 A1 | 9/2004 | Tour et al. |
| 2004/0184270 A1 | 9/2004 | Halter |
| 2004/0213375 A1 | 10/2004 | Bjorkholm et al. |
| 2004/0217297 A1 | 11/2004 | Moses et al. |
| 2004/0218651 A1 | 11/2004 | Iwasaki et al. |
| 2004/0231996 A1 | 11/2004 | Webb |
| 2004/0240035 A1 | 12/2004 | Zhilkov |
| 2004/0264867 A1 | 12/2004 | Kondo |
| 2005/0023145 A1 | 2/2005 | Cohen et al. |
| 2005/0045821 A1 | 3/2005 | Noji et al. |
| 2005/0045832 A1 | 3/2005 | Kelly et al. |
| 2005/0067286 A1 | 3/2005 | Ahn et al. |
| 2005/0082469 A1 | 4/2005 | Carlo |
| 2005/0092929 A1 | 5/2005 | Schneiker |
| 2005/0104684 A1 | 5/2005 | Wojcik |
| 2005/0105690 A1 | 5/2005 | Pau et al. |
| 2005/0152635 A1 | 7/2005 | Paddon et al. |
| 2005/0162104 A1 | 7/2005 | Victor et al. |
| 2005/0190637 A1 | 9/2005 | Ichimura et al. |
| 2005/0194258 A1 | 9/2005 | Cohen et al. |
| 2005/0201707 A1 | 9/2005 | Glebov et al. |
| 2005/0212503 A1 | 9/2005 | Deibele |
| 2005/0231138 A1 | 10/2005 | Nakanishi et al. |
| 2005/0285541 A1 | 12/2005 | LeChevalier |
| 2006/0007730 A1 | 1/2006 | Nakamura et al. |
| 2006/0018619 A1 | 1/2006 | Helffrich et al. |
| 2006/0035173 A1 | 2/2006 | Davidson et al. |
| 2006/0045418 A1 | 3/2006 | Cho et al. |
| 2006/0050269 A1 | 3/2006 | Brownell |
| 2006/0060782 A1 | 3/2006 | Khursheed |
| 2006/0062258 A1 | 3/2006 | Brau et al. |
| 2006/0131695 A1 | 6/2006 | Kuekes et al. |
| 2006/0159131 A1 | 7/2006 | Liu et al. |
| 2006/0187794 A1 | 8/2006 | Harvey et al. |
| 2006/0208667 A1 | 9/2006 | Lys et al. |
| 2006/0243925 A1 | 11/2006 | Barker et al. |
| 2006/0274922 A1 | 12/2006 | Ragsdale |
| 2007/0075263 A1 * | 4/2007 | Gorrell et al. ............... 250/400 |
| 2007/0075264 A1 | 4/2007 | Gorrell et al. |
| 2007/0085039 A1 * | 4/2007 | Gorrell et al. ........... 250/494.1 |
| 2007/0086915 A1 | 4/2007 | LeBoeuf et al. |
| 2007/0146704 A1 | 6/2007 | Schmidt et al. |
| 2007/0152176 A1 | 7/2007 | Gorrell et al. |
| 2007/0154846 A1 | 7/2007 | Gorrell et al. |
| 2007/0194357 A1 | 8/2007 | Oohashi et al. |
| 2007/0200940 A1 | 8/2007 | Gruhlke et al. |
| 2007/0252983 A1 | 11/2007 | Tong et al. |
| 2007/0258492 A1 * | 11/2007 | Gorrell ......................... 372/3 |
| 2007/0258689 A1 | 11/2007 | Gorrell et al. |
| 2007/0258690 A1 | 11/2007 | Gorrell et al. |
| 2007/0259641 A1 | 11/2007 | Gorrell |
| 2007/0264023 A1 | 11/2007 | Gorrell et al. |
| 2007/0264030 A1 | 11/2007 | Gorrell et al. |
| 2007/0284527 A1 | 12/2007 | Zani et al. |
| 2008/0069509 A1 * | 3/2008 | Gorrell et al. ............... 385/129 |
| 2008/0073590 A1 * | 3/2008 | Gorrell et al. ........... 250/493.1 |
| 2008/0149828 A1 * | 6/2008 | Gorrell et al. ............... 250/306 |
| 2008/0302963 A1 | 12/2008 | Nakasuji et al. |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 2000/072413 | 11/2000 |
| WO | WO 02/25785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

Search Report and Written Opinion mailed Oct. 25, 2007 in PCT Appln. No. PCT/US2006/022687.

Search Report and Written Opinion mailed Oct. 26, 2007 in PCT Appln. No. PCT/US2006/022675.

Search Report and Written Opinion mailed Sep. 21, 2007 in PCT Appln. No. PCT/US2006/022688.
Search Report and Written Opinion mailed Sep. 25, 2007 in PCT appln. No. PCT/US2006/022681.
Search Report and Written Opinion mailed Sep. 26, 2007 in PCT Appln. No. PCT/US2006/024218.
U.S. Appl. No. 11/418,082, filed May 5, 2006, Gorrell et al.
J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
Lee Kwang-Cheol et al., "Deep X-Ray Mask with Integrated Actuator for 3D Microfabrication", Conference: Pacific Rim Workshop on Transducers and Micro/Nano Technologies, (Xiamen Chn), Jul. 22, 2002.
Markoff, John, "A Chip That Can Transfer Data Using Laser Light," The New York Times, Sep. 18, 2006.
S.M. Sze, "Semiconductor Devices Physics and Technology", 2nd Edition, Chapters 9 and 12, Copyright 1985, 2002.
Search Report and Written Opinion mailed Feb. 12, 2007 in PCT Appln. No. PCT/US2006/022682.
Search Report and Written Opinion mailed Feb. 20, 2007 in PCT Appln. No. PCT/US2006/022676.
Search Report and Written Opinion mailed Feb. 20, 2007 in PCT Appln. No. PCT/US2006/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Mar. 7, 2007 in PCT Appln. No. PCT/US2006/022775.
Speller et al., "A Low-Noise MEMS Accelerometer for Unattended Ground Sensor Applications", Applied MEMS Inc., 12200 Parc Crest, Stafford, TX, USA 77477, date unknown.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
Search Report and Written Opinion mailed Apr. 23, 2008 in PCT Appln. No. PCT/US2006/022678.
Search Report and Written Opinion mailed Apr. 3, 2008 in PCT Appln. No. PCT/US2006/027429.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed May 2, 2008 in PCT Appln. No. PCT/US2006/023280.
Search Report and Written Opinion mailed May 21, 2008 in PCT Appln. No. PCT/US2006/023279.
Search Report and Written Opinion mailed May 22, 2008 in PCT Appln. No. PCT/US2006/022685.
Search Report and Written Opinion mailed Aug. 24, 2007 in PCT Appln. No. PCT/US2006/022768.
Search Report and Written Opinion mailed Aug. 31, 2007 in PCT Appln. No. PCT/US2006/022680.
Search Report and Written Opinion mailed Jul. 16, 2007 in PCT Appln. No. PCT/US2006/022774.
Search Report and Written Opinion mailed Jul. 20, 2007 in PCT Appln. No. PCT/US2006/024216.
Search Report and Written Opinion mailed Jul. 26, 2007 in PCT Appln. No. PCT/US2006/022776.
Search Report and Written Opinion mailed Jun. 20, 2007 in PCT Appln. No. PCT/US2006/022779.
Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022787.
Search Report and Written Opinion mailed Sep. 5, 2007 in PCT Appln. No. PCT/US2006/027428.
Search Report and Written Opinion mailed Sep. 17, 2007 in PCT Appln. No. PCT/US2006/022689.
"Array of Nanoklystrons for Frequency Agility or Redundancy," NASA's Jet Propulsion Laboratory, NASA Tech Briefs, NPO-21033. 2001.
"Hardware Development Programs," Calabazas Creek Research, Inc. found at http://calcreek.com/hardware.html, unknown date.
"Antenna Arrays." May 18, 2002. www.tpub.com/content/neets/14183/css/14183_159.htm.
"Diffraction Grating," hyperphysics.phy-astr.gsu.edu/hbase/phyopt/grating.html, unknown date.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany, unknown date.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bakhtyari, Dr. Arash, "Gain Mechanism in a Smith-Purcell MicroFEL," Abstract, Department of Physics and Astronomy, Dartmouth College, unknown date.
Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Booske, J.H. et al., "Microfabricated TWTs as High Power, Wideband Sources of THz Radiation", unknown date.
Brau, C.A. et al., "Gain and Coherent Radiation from a Smith-Purcell Free Electron Laser," Proceedings of the 2004 FEL Conference, pp. 278-281.
Brownell, J.H. et al., "Improved µFEL Performance with Novel Resonator," Jan. 7, 2005, from website: www.frascati.enea.it/thz-bridge/workshop/presentations/Wednesday/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Far-IR, Sub-MM & MM Detector Technology Workshop list of manuscripts, session 6 2002.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.

Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.

Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.

Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.

Ives, Lawrence et al., "Development of Backward Wave Oscillators for Terahertz Applications," Terahertz for Military and Security Applications, Proceedings of SPIE vol. 5070 (2003), pp. 71-82.

Ives, R. Lawrence, "IVEC Summary, Session 2, Sources I" 2002.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 pp. 117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA, unknown date.

Kormann, T. et al., "A Photoelectron Source for the Study of Smith-Purcell Radiation", unknown date.

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWeb.

Manohara, Harish M. et al., "Design and Fabrication of a THz Nanoklystron", unknown date.

Manohara, Harish M. et al., "Design and Fabrication of a THz Nanoklystron" (www.sofia.usra.edu/det_workshop/ posters/session 3/3-43manohara_poster.pdf), PowerPoint Presentation, unknown date.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in C12/O2 and O2 glow discharges," J.Vac. Sci. Technol. B. 17 (5), Sep./Oct. 1999, American Vacuum Society, pp. 2204-2209.

Ohtaka, Kazuo, "Smith-Purcell Radiation from Metallic and Dielectric Photonic Crystals," Center for Frontier Sceince, pp. 272-273, Chiba University, 1/-3 Yayoic, Inage-ku, Chiba-shi, Japan, unknown date.

Phototonics Research, "Surface-Plasmon-Enhanced Random Laser Demonstrated," Phototonics Spectra, Feb. 2005, pp. 112-113.

Platt, C.L. et al., "A New Resonator Design for Smith-Purcell Free Electron Lasers," 6Q19, p. 296, unknown date.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 μm quantum dot laser with temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

Corcoran, Elizabeth, "Ride the Light," Forbes Magazine, Apr. 11, 2005, pp. 68-70.

Neo et al., "Smith-Purcell Radiation from Ultraviolet to Infrared Using a Si-field Emitter" Vacuum Electronics Conference, 2007, IVEC '07, IEEE International May 2007.

Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.

Sartori, Gabriele, "CMOS Photonics Platform," Luxtera, Inc., Nov. 2005, 19 pages.

* cited by examiner

920

920

FREE ELECTRON OSCILLATOR

CROSS-REFERENCE TO CO-PENDING APPLICATIONS

The present invention is related to the following co-pending U.S. patent applications: (1) U.S. patent application Ser. No. 11/238,991, entitled "Ultra-Small Resonating Charged Particle Beam Modulator," and filed Sep. 30, 2005; (2) U.S. patent application Ser. No. 10/917,511, filed on Aug. 13, 2004, entitled "Patterning Thin Metal Film by Dry Reactive Ion Etching,"; (3) U.S. application Ser. No. 11/203,407, filed on Aug. 15, 2005, entitled "Method Of Patterning Ultra-Small Structures"; (4) U.S. application Ser. No. 11/243,476, entitled "Structures And Methods For Coupling Energy From An Electromagnetic Wave," filed on Oct. 5, 2005; (5) U.S. application Ser. No. 11/243,477, entitled "Electron Beam Induced Resonance," filed on Oct. 5, 2005, (6) U.S. application Ser. No. 11/411,130, entitled "Charged Particle Acceleration Apparatus and Method," filed on Apr. 26, 2006, (6) U.S. application Ser. No. 11/411,129, entitled "Micro Free Electron Laser (FEL)," filed on Apr. 26, 2006, and (7) U.S. application Ser. No. 11/418,091, entitled "Light Emitting Resonant Structure Driving Raman Laser," filed on May 5, 2006, all of which are commonly owned with the present application at the time of filing, and the entire contents of each of which are incorporated herein by reference.

BACKGROUND OF THE INVENTION

1. Field of the Invention

The present invention is directed to an oscillating electron source, and in one embodiment to a charged particle beam that oscillates between plural electrodes. Such an oscillating beam may be used to drive other devices, such as a pulsed light source acting as an input to a Raman laser.

2. Discussion of the Background

It is possible to emit a beam of charged particles according to a number of known techniques. Electron beams are currently being used in semiconductor lithography operations, such as in U.S. Pat. No. 6,936,981. The abstract of that patent also discloses the use of a "beam retarding system generates a retarding electric potential about the electron beams to decrease the kinetic energy of the electron beams substantially near a substrate."

An alternate charged particle source includes an ion beam. One such ion beam is a focused ion beam (FIB) as disclosed in U.S. Pat. No. 6,900,447 which discloses a method and system for milling. That patent discloses that "The positively biased final lens focuses both the high energy ion beam and the relatively low energy electron beam by functioning as an acceleration lens for the electrons and as a deceleration lens for the ions." Col. 7, lines 23-27.

Free electron lasers are known. In at least one prior art free electron laser (FEL), very high velocity electrons and magnets are used to make the magnetic field oscillations appear to be very close together during radiation emission. However, the need for high velocity electrons is disadvantageous. U.S. Pat. No. 6,636,534 discloses a FEL and some of the background thereon.

Raman lasers are also known, such as in U.S. Pat. No. 6,901,084. Furthermore, considerable research efforts have been made to find ways to integrate Raman laser capabilities with traditional semiconductor processes using silicon. One such effort was detailed in Demonstration of a silicon Raman laser, by Boyraz and Jalai, as published in Vol. 12, No. 21, Optics Express, October 2004.

When an electron hits a surface, it knocks out other electrons known as secondary electrons. A material property is the secondary electron yield (SEY) which is (for a given energy) the number of secondary electrons released per primary electron absorbed. Materials with SEY<1 tend to charge negatively; those materials with SEY>1 tend to charge positively.

SUMMARY OF THE INVENTION

According to one aspect of the disclosure, an oscillating source of charged particles is described which may be used to cause a beam of charged particles (e.g., an electron beam) to oscillate. In one such embodiment, a pair of opposing electrodes receive the beam of charged particles at varying times based on an amount of accumulated charge on the electrodes.

BRIEF DESCRIPTION OF THE DRAWINGS

For a more complete understanding of the present invention, and the advantages thereof, reference is now made to the following descriptions taken in conjunction with the accompanying drawings, in which.

DISCUSSION OF THE PREFERRED EMBODIMENTS

Figure 1:
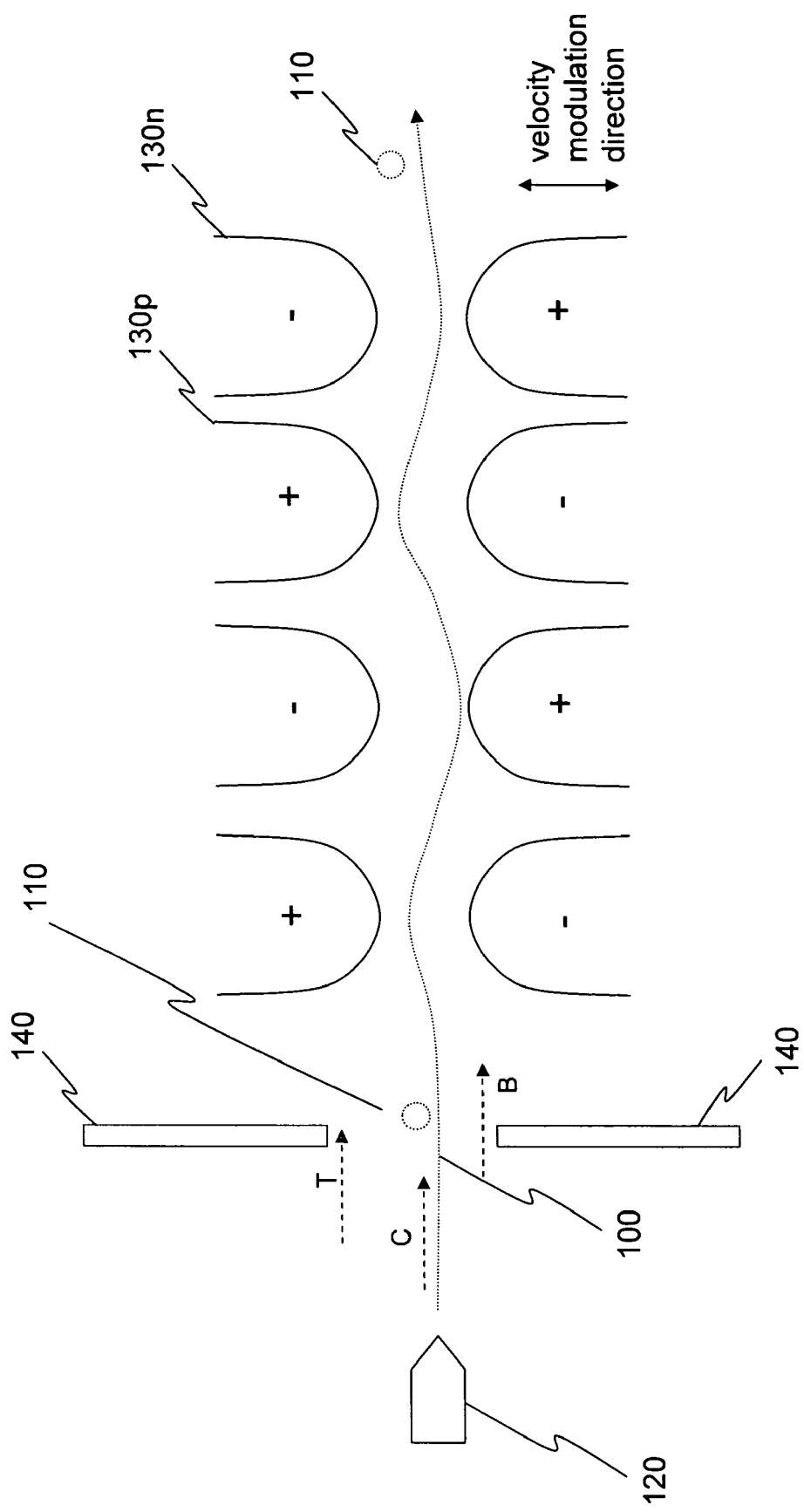
FIG. 1 is a top-view, high-level conceptual representation of a charged particle moving through a series of alternating electric fields according to a first embodiment of the present invention.

Turning now to the drawings, FIG. 1 is a high-level conceptual representation of a charged particle moving through a series of alternating electric fields according to a first embodiment of the present invention. As shown therein, a charged particle beam 100 including charged particles 110 (e.g., electrons) is generated from a charged particle source 120. The charged particle beam 100 can include ions (positive or negative), electrons, protons and the like. The beam may be produced by any source, including, e.g., without limitation an ion gun, a thermionic filament (e.g., a tungsten filament), a cathode, a planar vacuum triode, an electron-impact ionizer, a laser ionizer, a chemical ionizer, a thermal ionizer, an ion-impact ionizer.

As the beam 100 is projected, it passes between plural alternating electric fields 130p and 130n. As used herein, the phrase "positive electric field" 130p should be understood to mean an electric field that exerts an attractive force on a negatively charged particle, and the phrase "negative electric field" 130n should be understood to mean an electric field that exerts an attractive force on a positively charged particle. In this first embodiment, the electric fields 130p and 130n alternate not only on the same side but across from each other as well. That is, each positive electric field 130p is surrounded by a negative electric field 130n on three sides. Likewise, each negative electric field 130n is surrounded by a positive field 130p on three sides. In the illustrated embodiment, the charged particles 110 are electrons which are attracted to the positive electric fields 130p and repelled by the negative electric fields 130n. The attraction of the charged particles 110 to their oppositely charged fields 130p or 130n accelerates the charged particles 110 (mostly) transversely to their axial velocity.

The series of alternating fields creates an oscillating path in the directions of top to bottom of FIG. 1 and as indicated by the legend "velocity modulation direction." In such a case, the velocity modulation direction is generally perpendicular to the direction of motion of the beam 100.

The charged particle source 120 may also optionally include one or more electrically biased electrodes 140 (e.g., (a) grounding electrodes or (b) positively biased electrodes) which help to keep the charged particles (e.g., (a) electrons or negatively charged ions or (b) positively charged ions) on the desired path.

Figure 2:
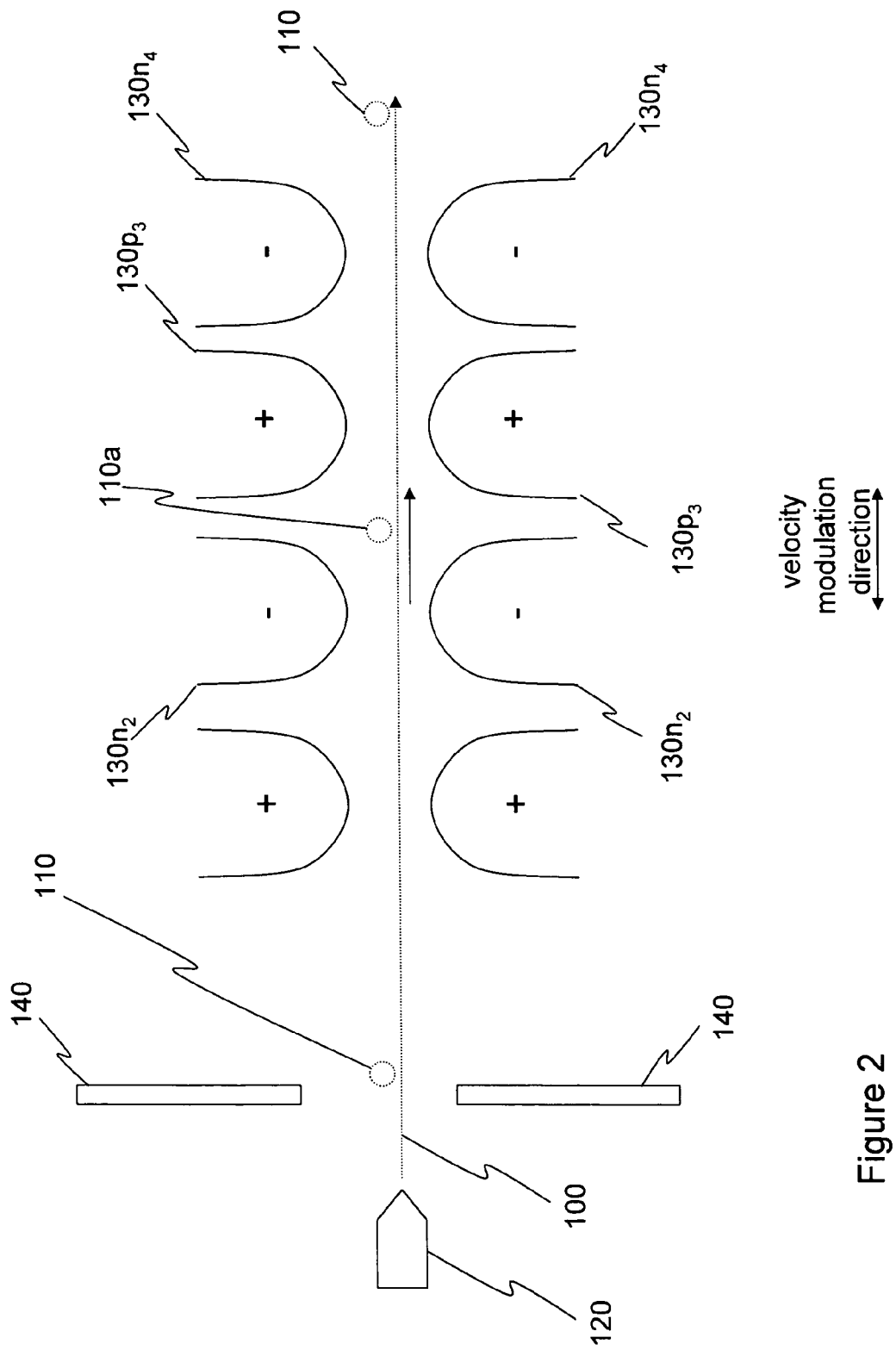
FIG. 2 is a top-view, high-level conceptual representation of a charged particle accelerating while being influenced by at least one field of a series of alternating electric fields according to a second embodiment of the present invention.
Figure 3:
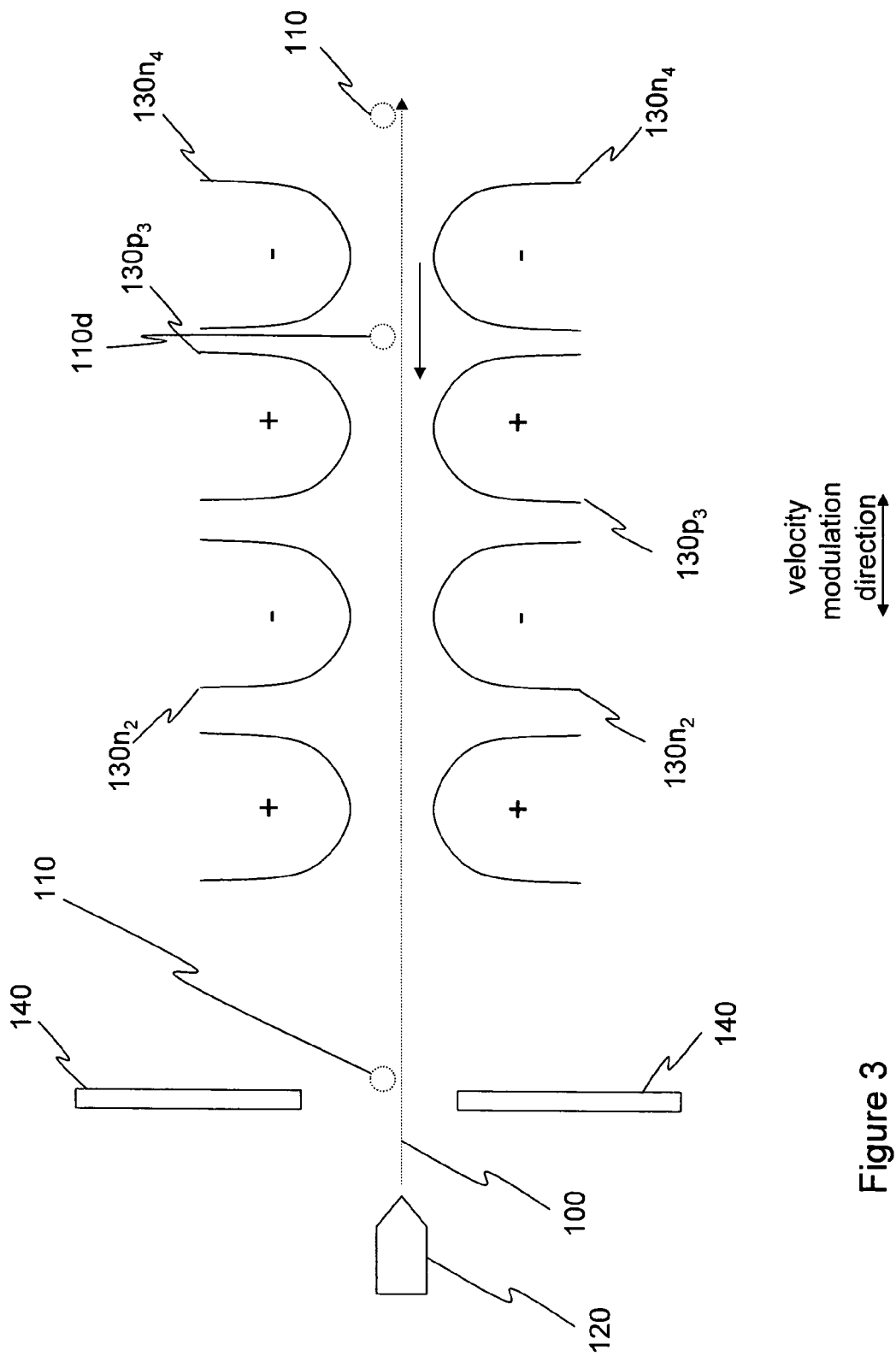
FIG. 3 is a top-view, high-level conceptual representation of a charged particle decelerating while being influenced by at least one field of a series of alternating electric fields according to a second embodiment of the present invention.

In the alternate embodiments illustrated in FIGS. 2 and 3, various elements from FIG. 1 have been repeated, and their reference numerals are repeated in FIGS. 2 and 3. However, the order of the electric fields 130p and 130n below the path of the charged particle beam 100 has been changed. In FIGS. 2 and 3, while the electric fields 130n and 130p are still alternating on the same side, they are now of opposing direction on opposite sides of the beam 100, allowing for minimal net force on the charged particles 110 perpendicular to the beam 100. There is, though, a force of oscillatory character acting on the charged particles 100 in the direction of the beam 100. Thus, in the case of an electron acting as a charged particle 110, the electron 110a in FIG. 2 is an accelerating electron that is being accelerated by being repelled from the negative fields $130n_2$ while being attracted to the next positive fields $130p_3$ in the direction of motion of the beam 100. (The direction of acceleration is shown below the accelerating electron 110a.)

Conversely, as shown in FIG. 3, in the case of an electron acting as a charged particle 110, the electron 110d in FIG. 2 is a decelerating electron that is being decelerated (i.e., negatively accelerated) as it approaches the negative fields $130n_4$ while still being attracted to the previous positive fields $130p_3$. The direction of acceleration is shown below the decelerating electron 100d. Moreover, both FIGS. 2 and 3 include the legend "velocity modulation direction" showing the direction of the velocity changes. In such cases, the velocity modulation direction is generally parallel to the direction of motion of the beam 100. It should be understood, however, that the direction of the electron does not change, only that its velocity increases and decreases along the axial path.

By varying the order and strength of the electric fields 130n and 130p, a variety of magnitudes of acceleration can be achieved allowing for attenuation of the motion of the charged particles 110. As should be understood from the disclosure, the strengths of adjacent electric fields, fields on the same side of the beam 100 and fields on opposite sides of the beam 100 need not be the same strength. Moreover, the strengths of the fields and the directions of the fields need not be fixed either but may instead vary with time. The fields 130n and 130p may even be created by applying a electromagnetic wave to a resonant structure, described in greater detail below.

The electric fields utilized by the present invention can be created by any known method which allows sufficiently fine-tuned control over the paths of the charged particles so that they stay within their intended path boundaries.

According to one aspect of the present invention, the electric fields can be generated using at least one resonant structure where the resonant structure resonates at a frequency above a microwave frequency. Resonant structures include resonant structures shown in or constructed by the teachings of the above-identified co-pending applications. In particular, the structures and methods of U.S. application Ser. No. 11/243,477, entitled "Electron Beam Induced Resonance," filed on Oct. 5, 2005, can be utilized to create electric fields 130 for use in the present invention.

Figure 4:
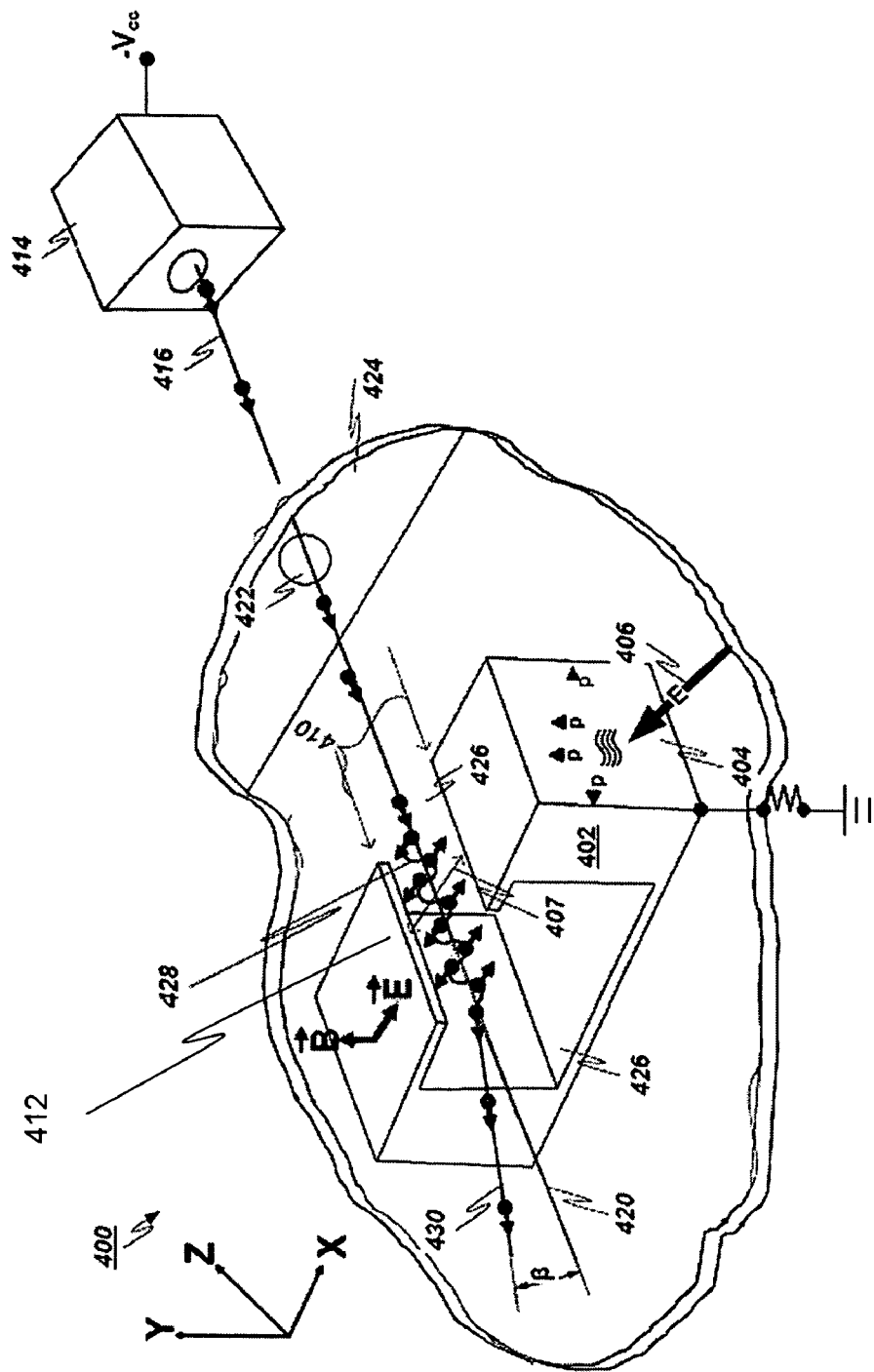
FIG. 4 is a perspective-view, high-level conceptual representation of a charged particle moving through a series of alternating electric fields produced by a resonant structure.

FIG. 4 is a perspective-view, high-level conceptual representation of a charged particle moving through a series of alternating electric fields produced by a resonant structure (RS) 402 (e.g., a microwave resonant structure or an optical resonant structure). An electromagnetic wave 406 (also denoted E) incident to a surface 404 of the RS 402 transfers energy to the RS 402, which generates a varying field 407. In the exemplary embodiment shown in FIG. 4, a gap 410 formed by ledge portions 412 can act as an intensifier. The varying field 407 is shown across the gap 410 with the electric and magnetic field components (denoted $\vec{E}$ and $\vec{B}$) generally along the X and Y axes of the coordinate system, respectively.

Since a portion of the varying field can be intensified across the gap 410, the ledge portions 412 can be sized during fabrication to provide a particular magnitude or wavelength of the varying field 407.

A charged particle source 414 (such as the source 120 described with reference to FIGS. 1-3) targets a beam 416 (such as a beam 100) of charged particles (e.g., electrons) along a straight path 420 through an opening 422 on a sidewall 424 of the device 400. The charged particles travel through a space 426 within the gap 410. Upon interaction with the varying field 426, the charged particles are shown angularly modulated from the straight path 420. Generally, the charged particles travel on an oscillating path 428 within the gap 410. After passing through the gap 410, the charged particles are angularly modulated on a new path 430. An angle β illustrates the deviation between the new path 430 and the straight path 420.

As would be appreciated by one of ordinary skill in the art, a number of resonant structures 402 can be repeated to provide additional electric -fields for influencing the charged particles of the beam 416. Alternatively, the direction of the oscillation can be changed by turning the resonant structure 402 on its side onto surface 404.

Figure 5A:
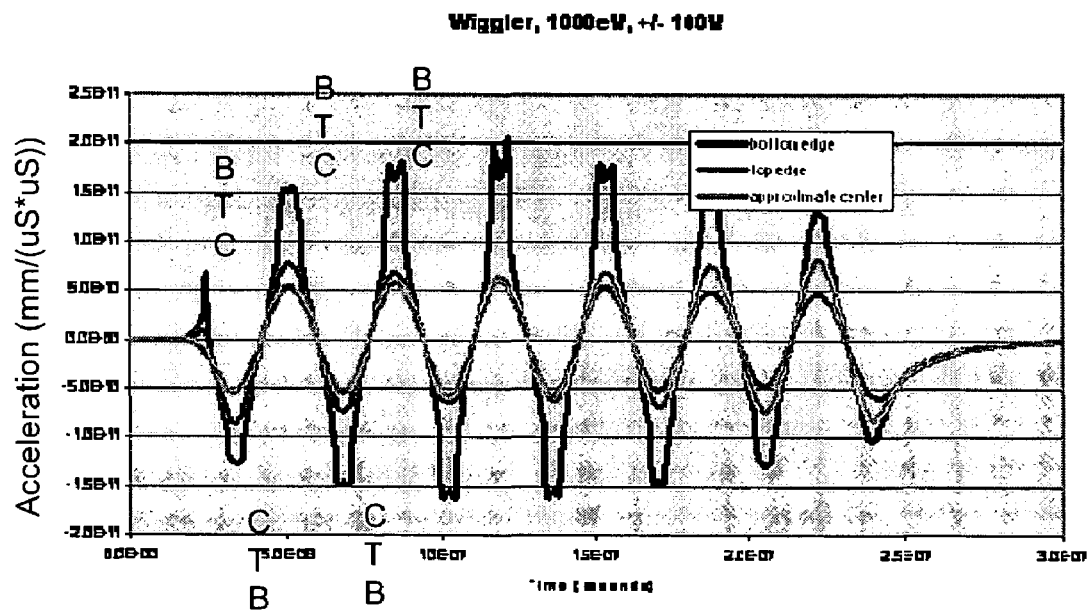
FIGS. 5A-5C are the outputs of a computer simulation showing trajectories and accelerations of model devices using potentials of +/−100V, +/−200V, and +/−300V, respectively.
Figure 5B:
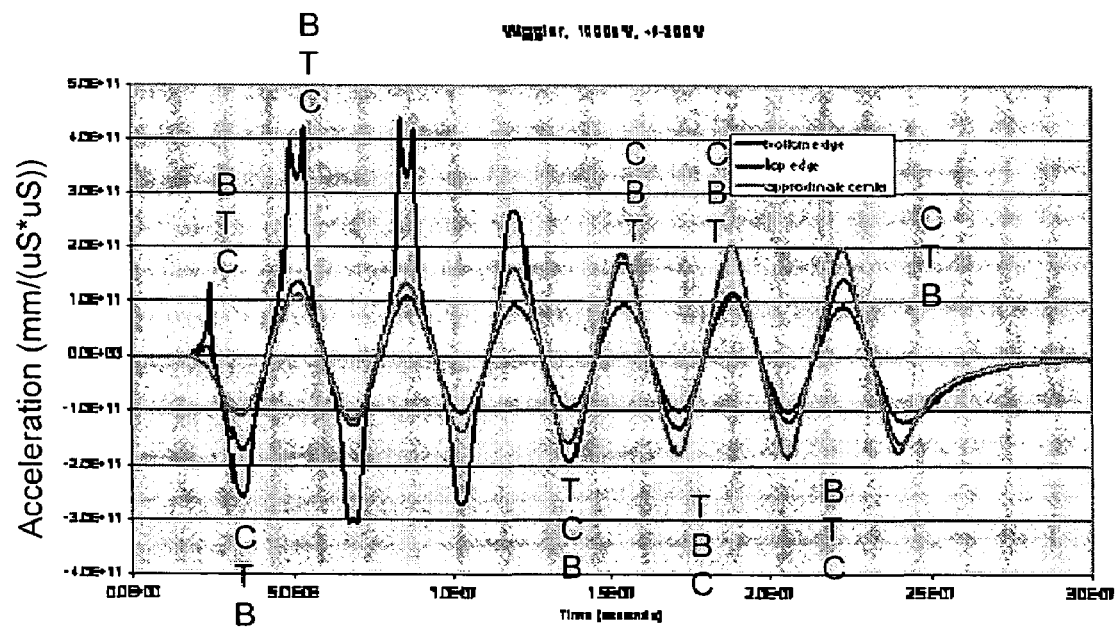
Figure 5C:
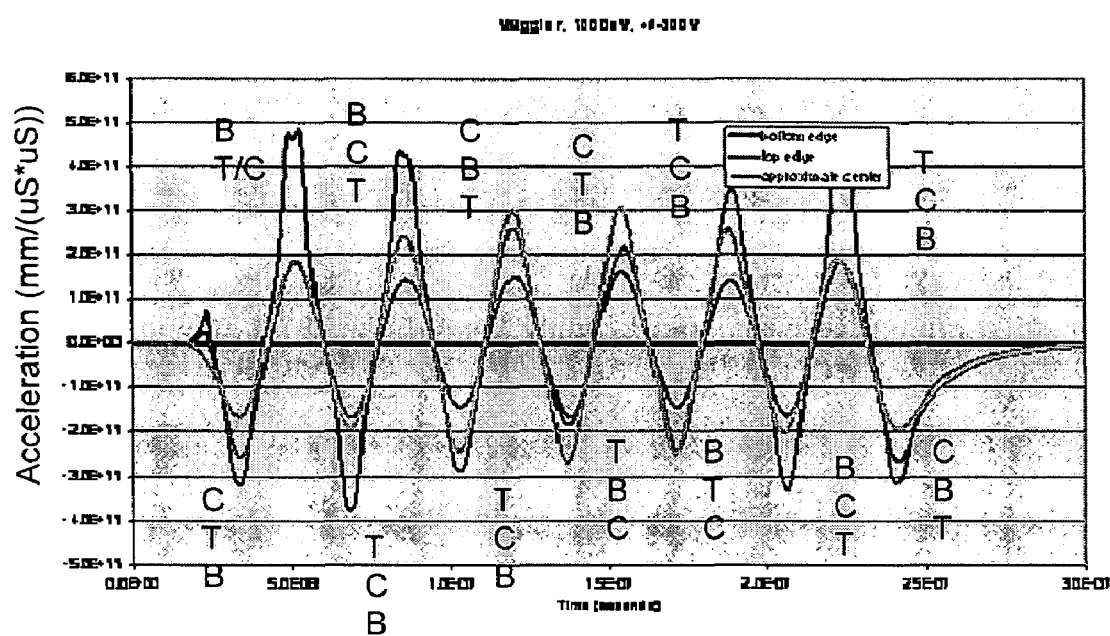

FIGS. 5A-5C are outputs of computer simulations showing trajectories and accelerations of model devices according to the present invention. The outputs illustrate three exemplary paths, labeled "B", "T" and "C" for bottom, top and center, respectively. As shown on FIG. 1, these correspond to charged particles passing through the bottom, top and center, respectively, of the opening between the electrodes 140. Since the curves for B, T and C cross in various locations, the graphs are labeled in various locations. As can be seen in FIG. 5A, the calculations show accelerations of about $0.5 \times 10^{11}$ mm/µS$^2$ for electrons with 1 keV of energy passing through a potential of +/−100 volts when passing through the center of the electrodes. FIG. 5B shows accelerations of about $1.0 \times 10^{11}$ mm/µS$^2$ for electrons with 1 keV of energy passing through a potential of +/−200 volts when passing through the center of the electrodes. FIG. 5C shows accelerations of about $1.0$-$3.0 \times 10^{11}$ mm/µS$^2$ for electrons with 1 keV of energy passing through a potential of +/−300 volts when passing through the center of the electrodes.

Utilizing the alternating electric fields of the present invention, the oscillating charged particles emit photons to achieve a radiation emitting device. Such photons can be used to provide radiation outside the device or to provide radiation for use internally as well. Moreover, the amount of radiation emitted can be used as part of a measurement device. It is also possible to construct the electrode of such a size and spacing that they resonate at or near the frequency that is being generated. This effect can be used to enhance the applied fields in the frequency range that the device emits.

Figure 6:
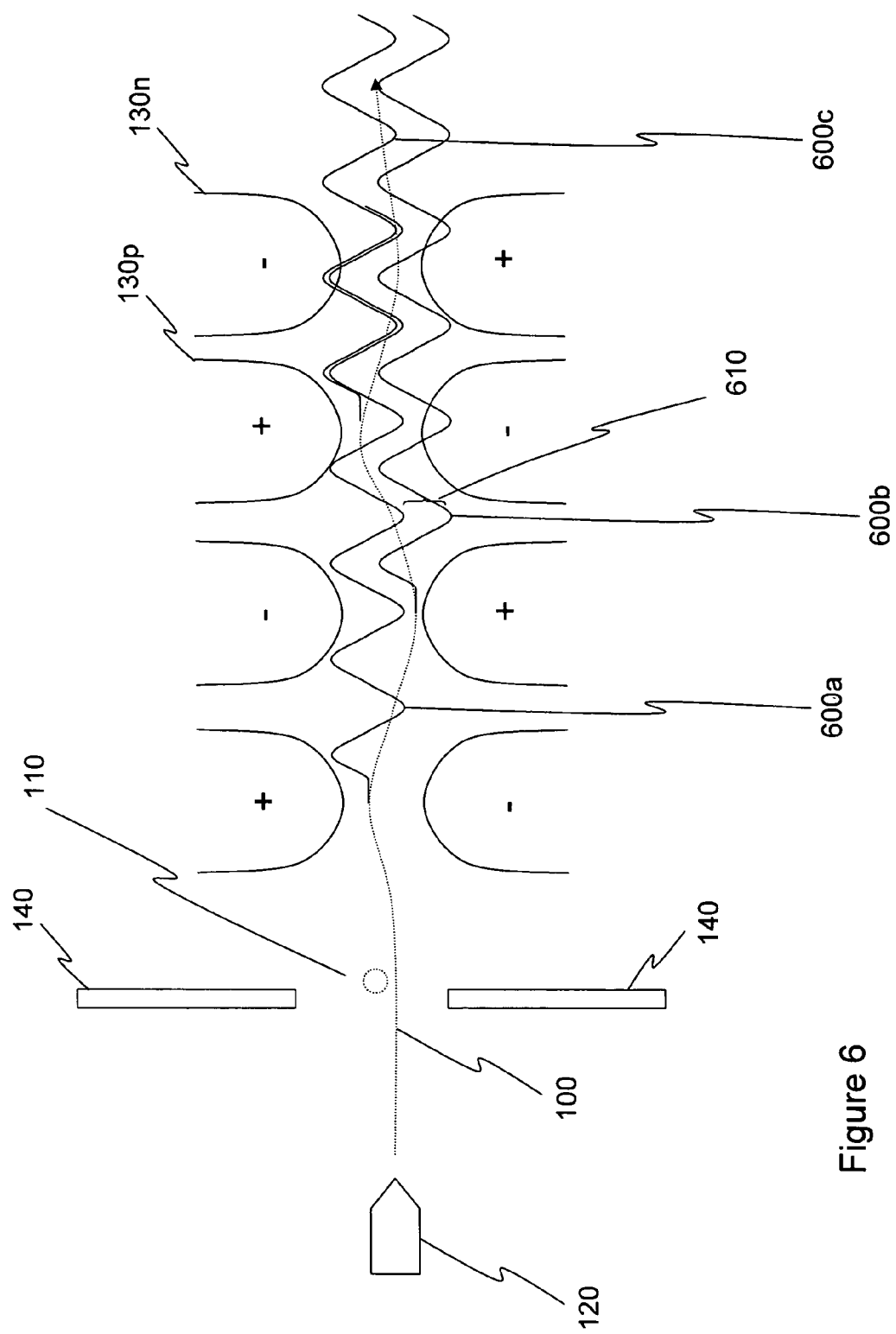
FIG. 6 is a top-view, high-level conceptual representation of a charged particle moving through a series of alternating electric fields according to a first embodiment of the present invention such that photons are emitted in phase with each other.

Turning to FIG. 6, the structure of FIG. 1 has been supplemented with the addition of photons 600a-600c. In the illustrated embodiment, the electric fields 130p and 130n are selected such that the charged particles 110 are forced into an oscillating trajectory at (or nearly at) an integral multiple of the emitted wavelength. Using such a controlled oscillation, the electromagnetic radiation emitted at the maxima and minima of the oscillation constructively interferes with the emission at the next minimum or maximum. As can be seen, for example at 610, the photon emissions are in phase with each other. This produces a coherent radiation source that can be used in laser applications such as communications systems using optical switching.

Figure 7:
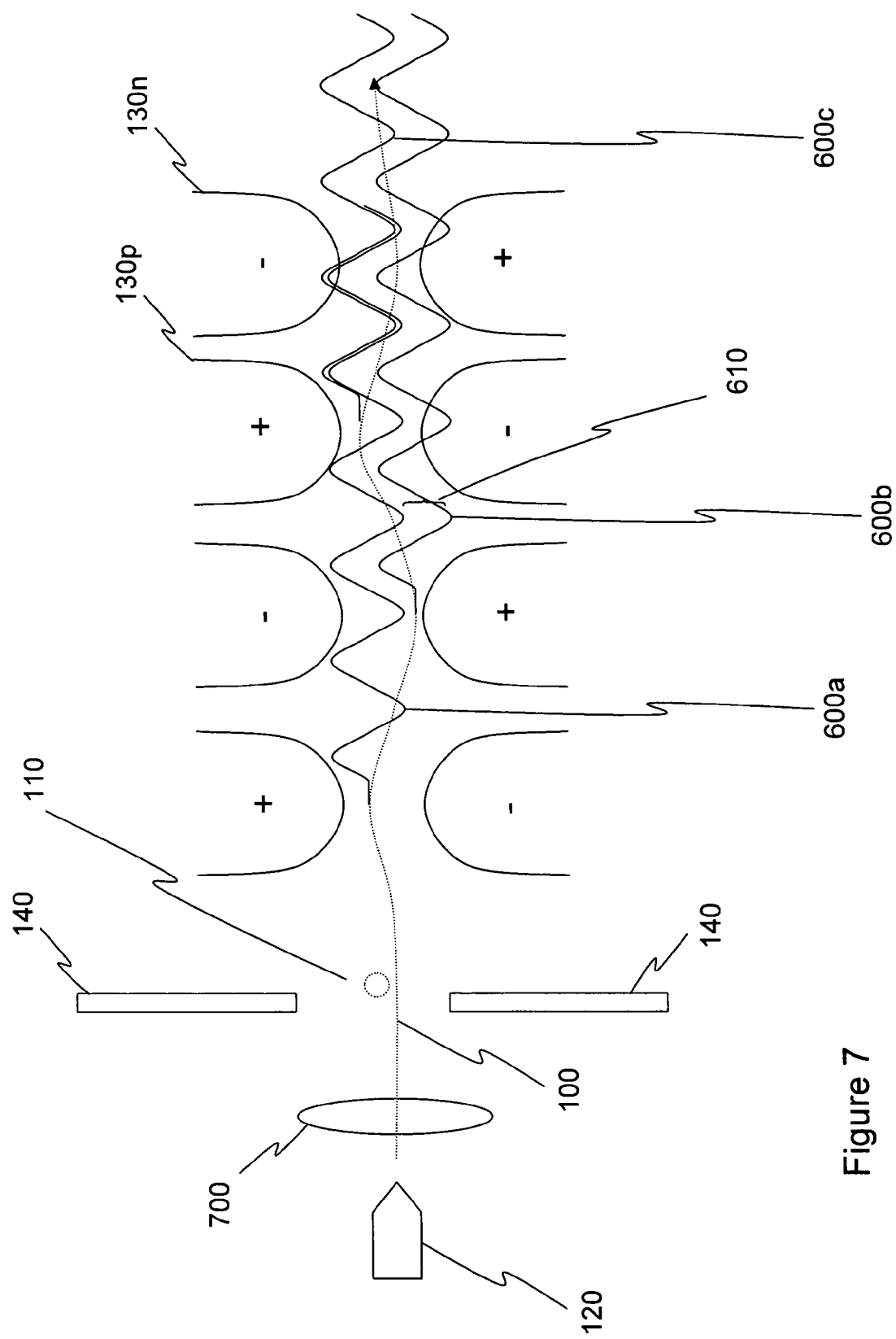
FIG. 7 is a top-view, high-level conceptual representation of a charged particle moving through a series of alternating electric fields according to a second embodiment of the present invention that includes a focusing element.

In light of the variation in paths that a charged particle can undergo based on its initial path between electrodes 140, in a second embodiment of a coherent radiation source, as in FIG. 7, a focusing element 700 is added in close proximity to the electrodes 140. The focusing element 700, while illustrated as being placed before the electrodes 140 may instead be placed after. In such a configuration, additional charged particles may traverse a center path between the fields and undergo constructive interference.

Figure 8:
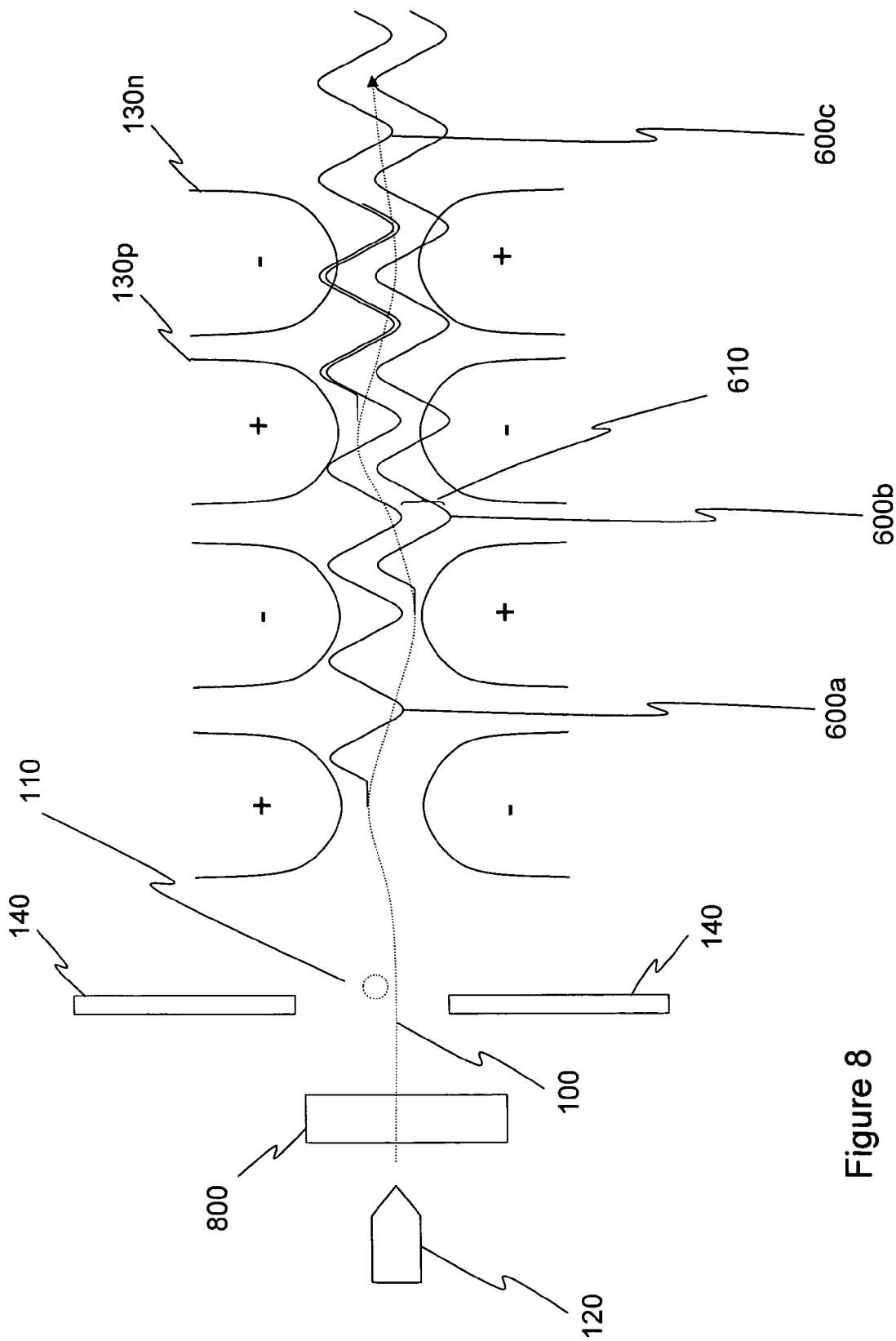
FIG. 8 is a top-view, high-level conceptual representation of a charged particle moving through a series of alternating electric fields according to a third embodiment of the present invention that includes a pre-bunching element.
Figure 9A:
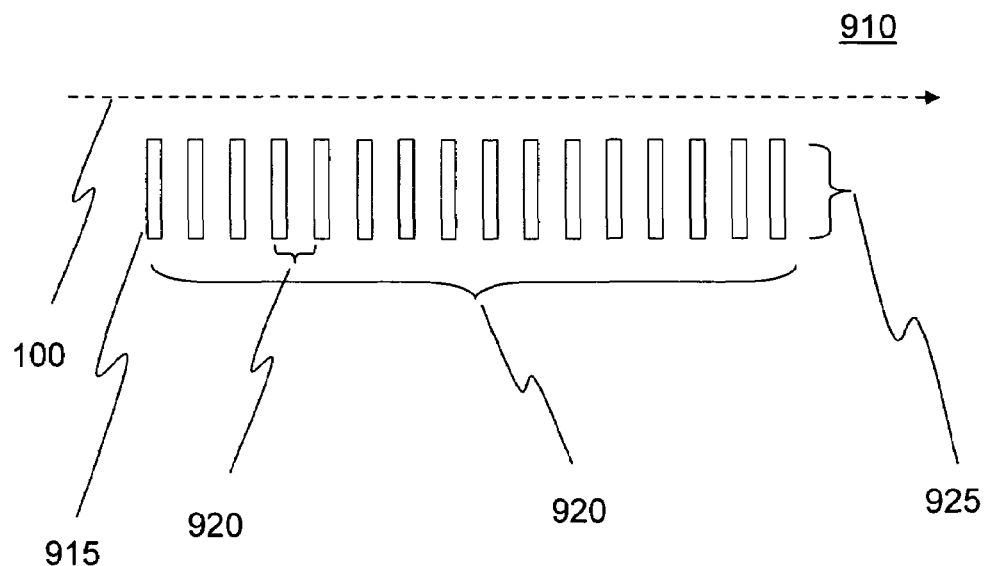
FIGS. 9A through 9H are exemplary resonant structures acting as pre-bunching elements.

In a third embodiment of a coherent light source, as in FIG. 8, a pre-bunching element 800 is added which helps to control the inter-arrival time between charged particles, and therefore aid in the production of coherent Electromagnetic Radiation (EMR). One possible configuration of a pre-bunching element 800 is a resonant structure such as is described in U.S. application Ser. No. 11/410,924, entitled "Selectable Frequency EMR Emitter," filed on Apr. 26, 2006 and incorporated herein by reference. However, exemplary resonant structures are shown in FIGS. 9A-9H. As shown in FIG. 9A, a resonant structure 910 may comprise a series of fingers 915 which are separated by a spacing 920 measured as the beginning of one finger 915 to the beginning of an adjacent finger 915. The finger 915 has a thickness that takes up a portion of the spacing between fingers 915. The fingers also have a length 925 and a height (not shown). As illustrated, the fingers 915 of FIG. 9A are perpendicular to the beam 100.

Resonant structures 910 are fabricated from resonating material [e.g., from a conductor such as metal (e.g., silver, gold, aluminum and platinum or from an alloy) or from any other material that resonates in the presence of a charged particle beam]. Other exemplary resonating materials include carbon nanotubes and high temperature superconductors.

Any of the various resonant structures can be constructed in multiple layers of resonating materials but are preferably constructed in a single layer of resonating material (as described above). In one single layer embodiment, all of the parts of a resonant structure 910 are etched or otherwise shaped in the same processing step. In one multi-layer embodiment, resonant structures 910 of the same resonant frequency are etched or otherwise shaped in the same processing step. In yet another multi-layer embodiment, all resonant structures having segments of the same height are etched or otherwise shaped in the same processing step. In yet another embodiment, all of the resonant structures on a single substrate are etched or otherwise shaped in the same processing step.

The material need not even be a contiguous layer, but can be sub-parts of the resonant structures individually present on a substrate. The materials making up the sub-parts of the resonant structures can be produced by a variety of methods, such as by pulsed-plating, depositing, sputtering or etching. Preferred methods for doing so are described in co-pending U.S. application Ser. No. 10/917,571, filed on Aug. 13, 2004, entitled "Patterning Thin Metal Film by Dry Reactive Ion Etching," and in U.S. application Ser. No. 11/203,407, filed on Aug. 15, 2005, entitled "Method Of Patterning Ultra-Small Structures," both of which are commonly owned at the time of filing, and the entire contents of each of which are incorporated herein by reference.

At least in the case of silver, etching does not need to remove the material between segments or posts all the way down to the substrate level, nor does the plating have to place the posts directly on the bare substrate. Silver posts can be on a silver layer on top of the substrate. In fact, we discovered that due to various coupling effects, better results are obtained when the silver posts are set on a silver layer that is deposited on the substrate.

Figure 9B:
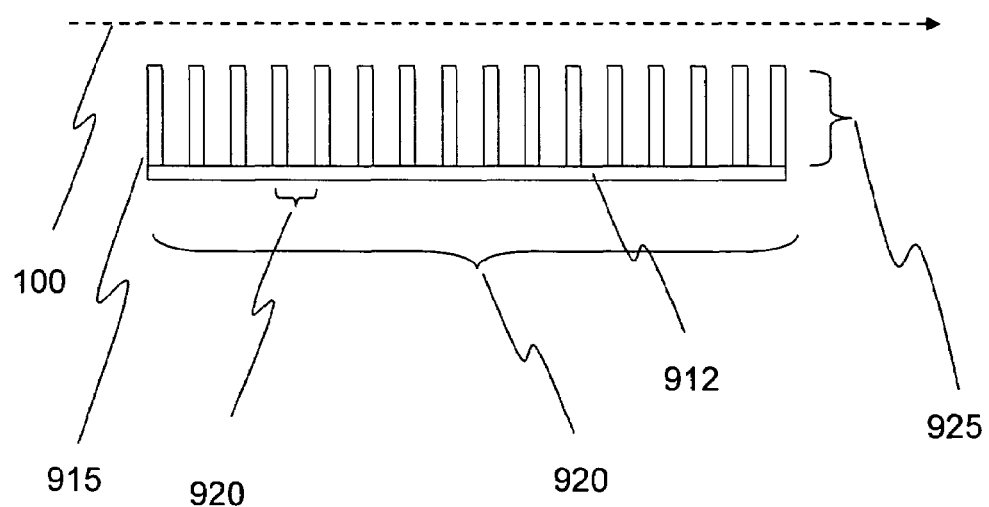
Figure 9C:
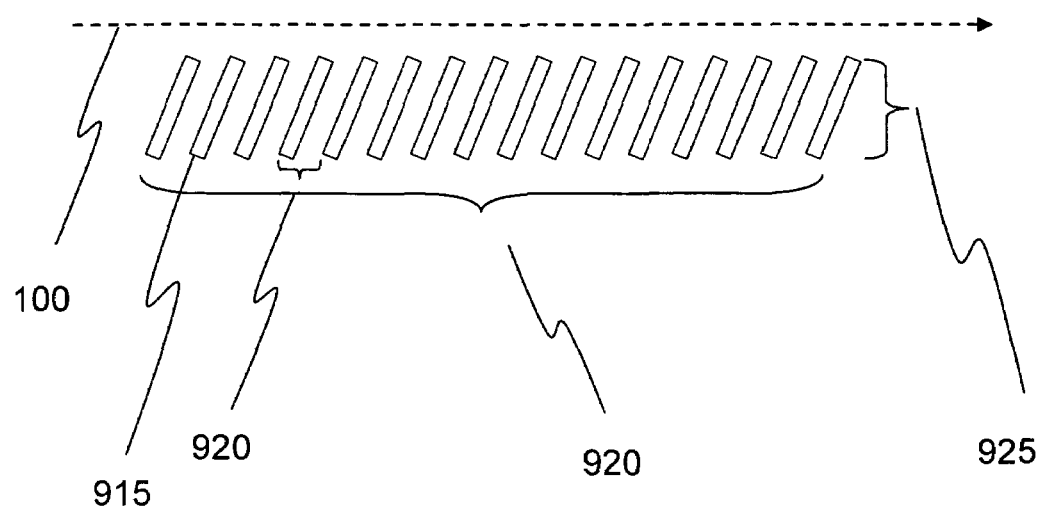
Figure 9D:
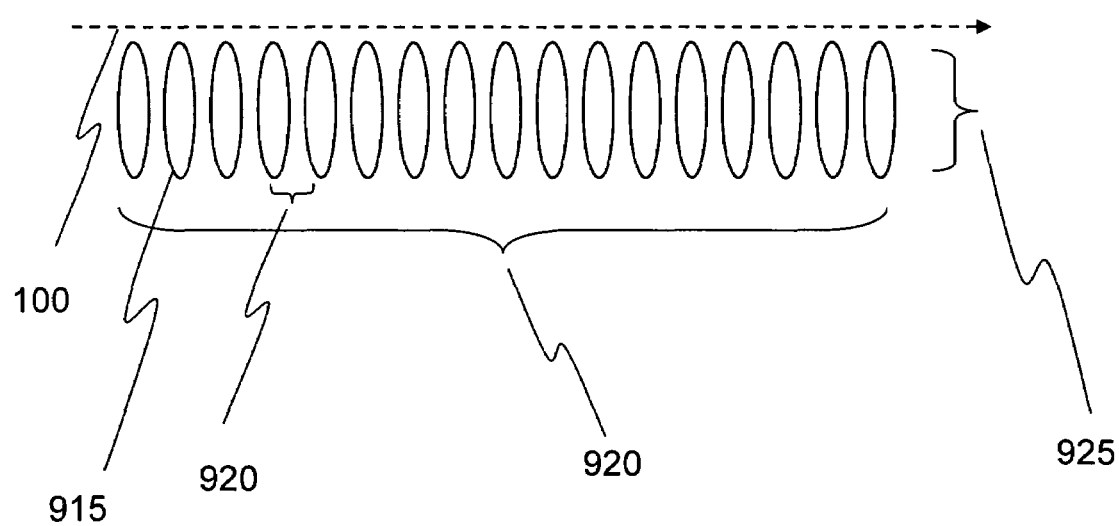
Figure 9E:
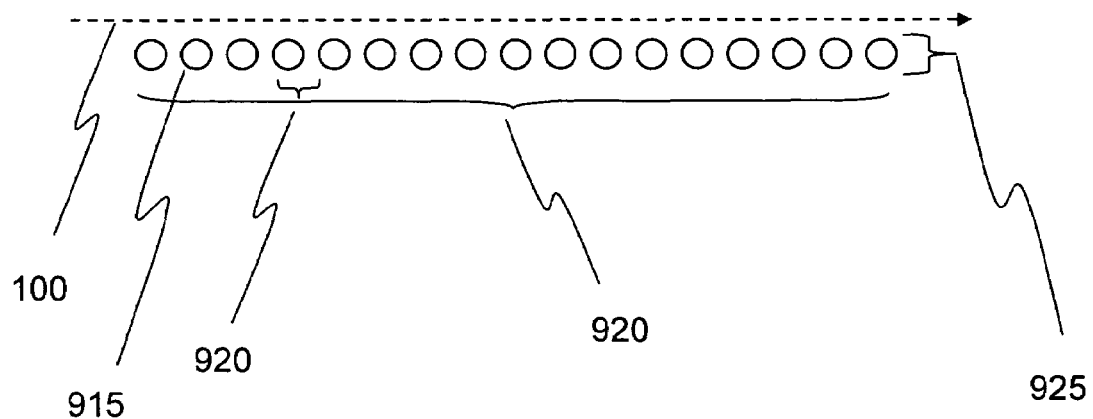
Figure 9F:
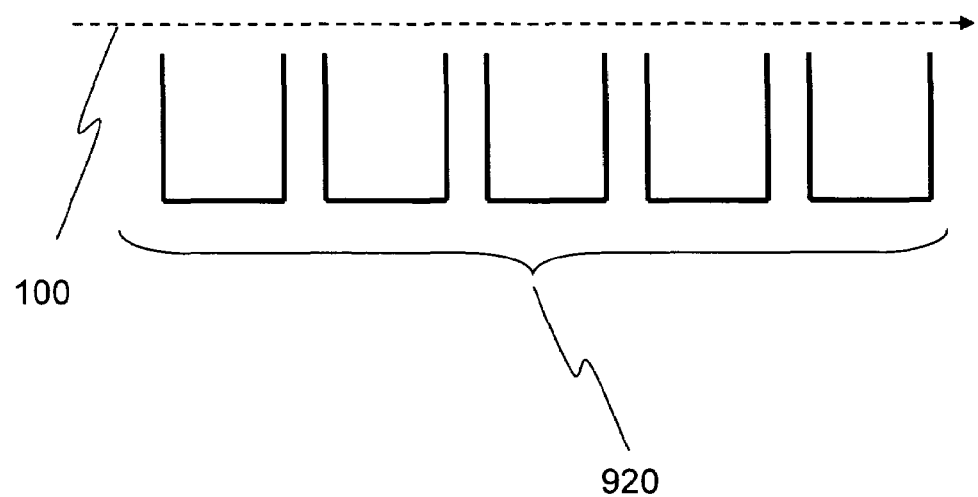
Figure 9G:
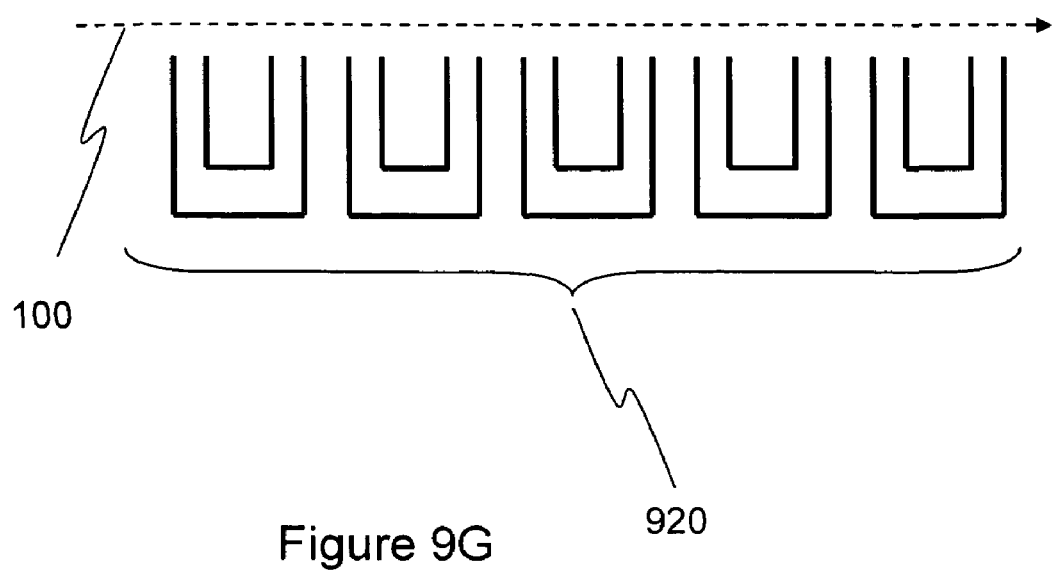
Figure 9H:
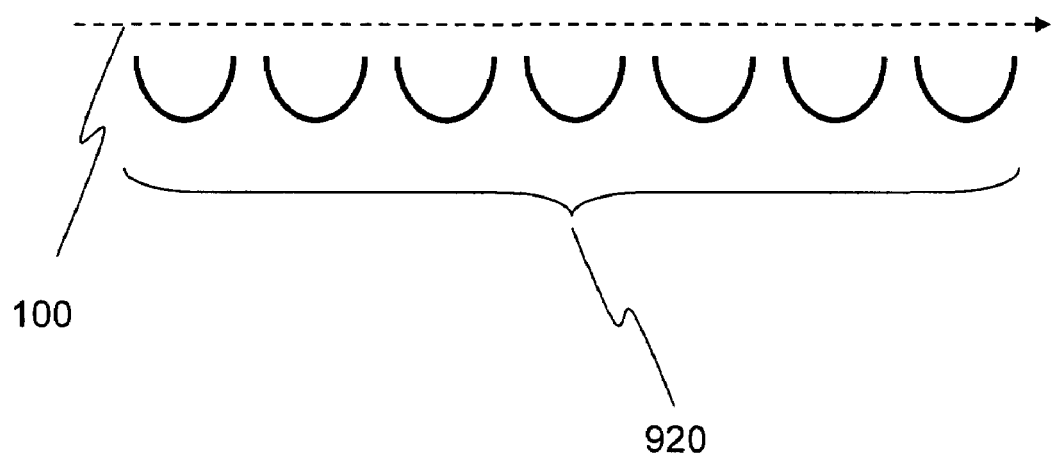

As shown in FIG. 9B, the fingers of the resonant structure 910 can be supplemented with a backbone. The backbone 912 connects the various fingers 915 of the resonant structure 910 forming a comb-like shape. Typically, the backbone 912 would be made of the same material as the rest of the resonant structure 910, but alternative materials may be used. In addition, the backbone 912 may be formed in the same layer or a different layer than the fingers 915. The backbone 912 may also be formed in the same processing step or in a different processing step than the fingers 915. While the remaining figures do not show the use of a backbone 912, it should be appreciated that all other resonant structures described herein can be fabricated with a backbone also.

The shape of the fingers 915 (or posts) may also be shapes other than rectangles, such as simple shapes (e.g., circles, ovals, arcs and squares), complex shapes [e.g., semi-circles, angled fingers, serpentine structures and embedded structures (i.e., structures with a smaller geometry within a larger geometry, thereby creating more complex resonances)] and those including waveguides or complex cavities. The finger structures of all the various shapes will be collectively referred to herein as "segments." Other exemplary shapes are shown in FIGS. 9C-9H, again with respect to a path of a beam 100. As can be seen at least from FIG. 9C, the axis of symmetry of the segments need not be perpendicular to the path of the beam 100.

Exemplary dimensions for resonant structures include, but are not limited to:

(a) period (920) of segments: 150-220 nm;
(b) segment thickness: 75-110 nm;
(c) height of segments: 250-400 nm;
(d) length (925) of segments: 60-180 nm; and
(e) number of segments in a row: 200-300.

While the above description has been made in terms of structures for achieving the acceleration of charged particles, the present invention also encompasses methods of accelerating charged particles generally. Such a method includes: generating a beam of charged particles; providing a series of alternating electric fields along an intended path; and transmitting the beam of charged particles along the intended path through the alternating electric fields.

The resonant structures producing coherent light described above can be laid out in rows, columns, arrays or other configurations such that the intensity of the resulting EMR is increased.

Figure 10:
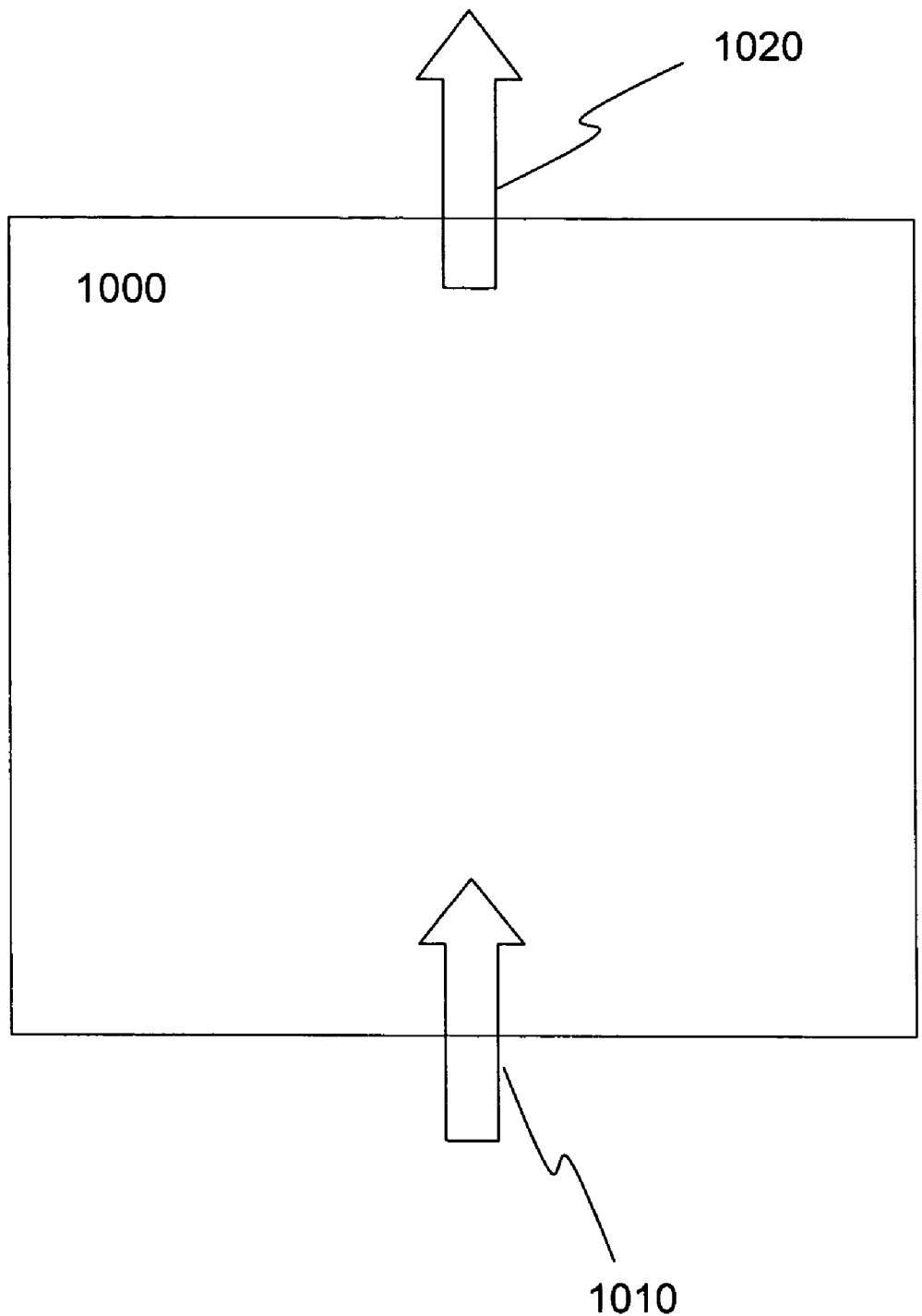
FIG. 10 is a top-level diagram of a Raman laser for producing coherent laser-light from a substantially coherent light source according to the present invention.

The coherent EMR produced may additionally be used as an input to additional devices. For example, the EMR may be used as an input to a light amplifier such as a Raman laser. As shown in FIG. 10, a Raman laser 1000 receives substantially coherent light at an input 1010 and outputs a laser signal at an output 1020. The Raman laser may be made from any Raman medium and is preferably made of a medium that integrates with the fabrication of the EMR source.

By integrating the coherent EMR sources described above with Raman laser elements that can be similarly integrated into a semiconductor process, the combined switching devices can enjoy a high degree of integration. However, the Raman laser elements may be fabricated in a different integrated circuit than the source of the coherent EMR. The optical switching element may form part of a micro-electro-mechanical system (MEMS), or may be part of a multi-chip module which is combined with a coherent EMR source.

In addition to using coherent EMR from the above structures using a pre-bunching element and alternating electric fields, it is also possible to utilize substantially coherent EMR emitted directly from a resonant structure that is caused to resonate by passing a beam of charged particles in close enough proximity to the resonant structure. The frequency of the EMR can be controlled by properly selecting the dimensions of the resonant structure, such as is described in U.S. application Ser. No. 11/410,924, entitled "Selectable Frequency EMR Emitter," filed on Apr. 26, 2006.

When using the resonant structures or the series of alternating fields, electromagnetic radiation at frequencies other than a desired frequency may be produced. Accordingly, one or more filters may be placed between the source of the substantially coherent light (e.g., either the resonant structures or the series of alternating fields) and the input to the Raman laser. This removes the unwanted frequencies so that the filtered light can better excite the Raman laser.

The resulting Raman laser can then be used in any existing environment that Raman lasers have been used in previously. Exemplary uses include telecommunications systems using laser-based signals carried over fiber-optic cables.

Figure 11A:
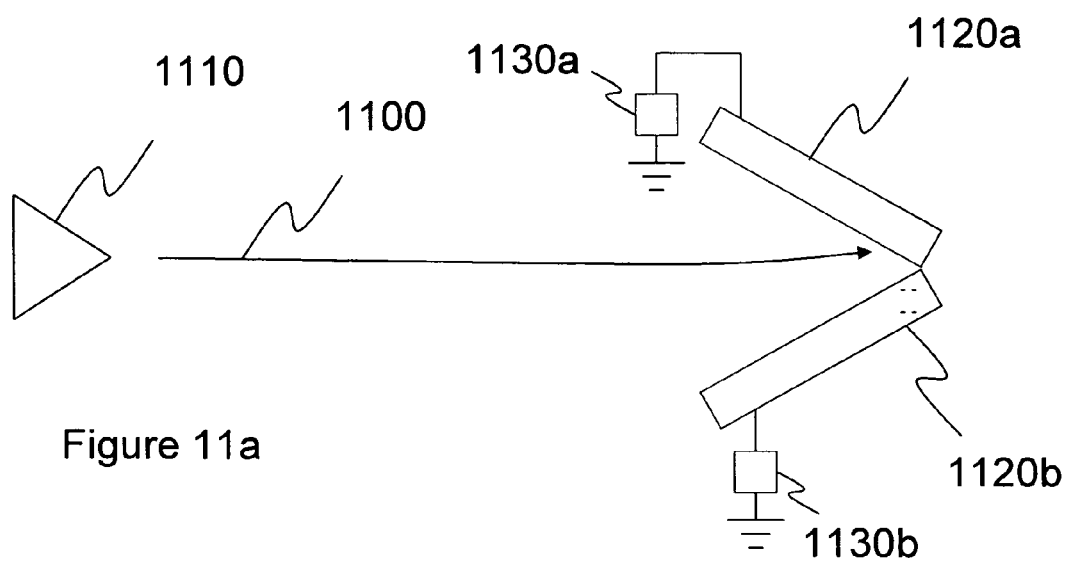
FIGS. 11a and 11b represent a pair of electrodes between which a charged particle beam oscillates.

As shown in FIG. 11a, a beam of charged particles 1100 (e.g., an electron beam) from a charged particle source 1110 can be selectively applied to a pair of electrodes 1120a and 1120b. In the configuration illustrated in FIG. 11a, the charged particles are electrons (with negative charges) that are directed toward a first electrode 1120a because the second electrode 1120b is illustrated as initially negatively charged. For illustrative purposes, the material of the electrodes is assumed to have a secondary electron yield (SEY)<1. Thus, the electrodes accumulate negatively charged particles when being struck by the electron beam. The electrodes 1120a and 1120b are connected via circuits 1130a and 1130b to ground which enable accumulated charge to be bled off. The circuits 1130a and 1130b may include any one or a combination of circuit elements, e.g., resistors, conductors, capacitors, inductors, diodes, triodes, and vacuum-based structures. The circuits 1130a and 1130b also need not be the same (e.g., they may have different resistances, capacitances, etc.).

Figure 11B:
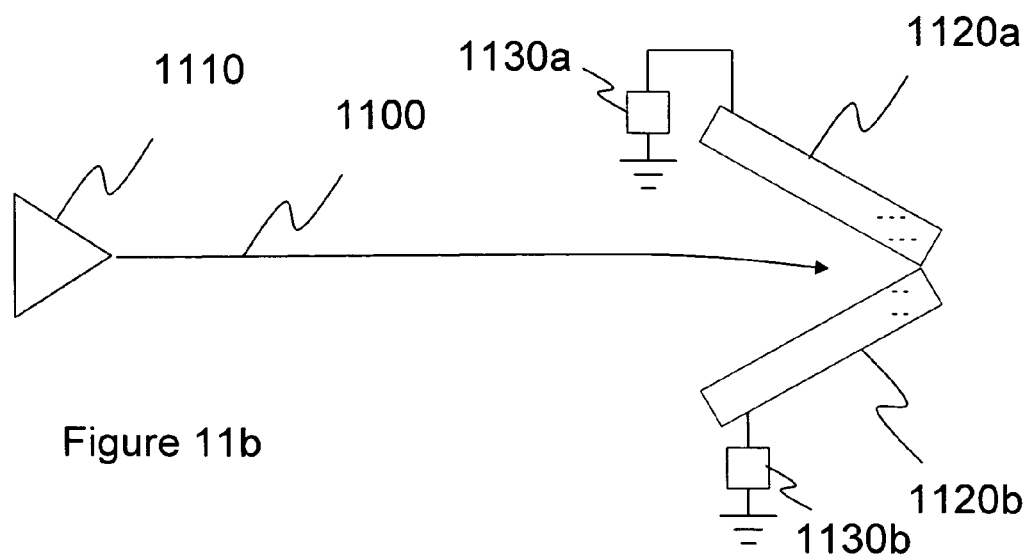

As shown in FIG. 11b, after the first electrode 1120a has been struck for a period of time by the incoming beam, the first electrode 1120a accumulates a sufficient amount of charge to have a stronger repelling force than the second electrode 1120b. At that point, the beam 1100 is deflected towards the second electrode 1120b, and the second electrode 1120b begins to accumulate charge. When the second electrode 1120b has accumulated a sufficient amount of charge to have a stronger repelling force than the first electrode, then the beam will again be deflected towards the first electrode 1120a. This oscillation will continue and produce a time-varying charged particle beam.

Figure 12A:
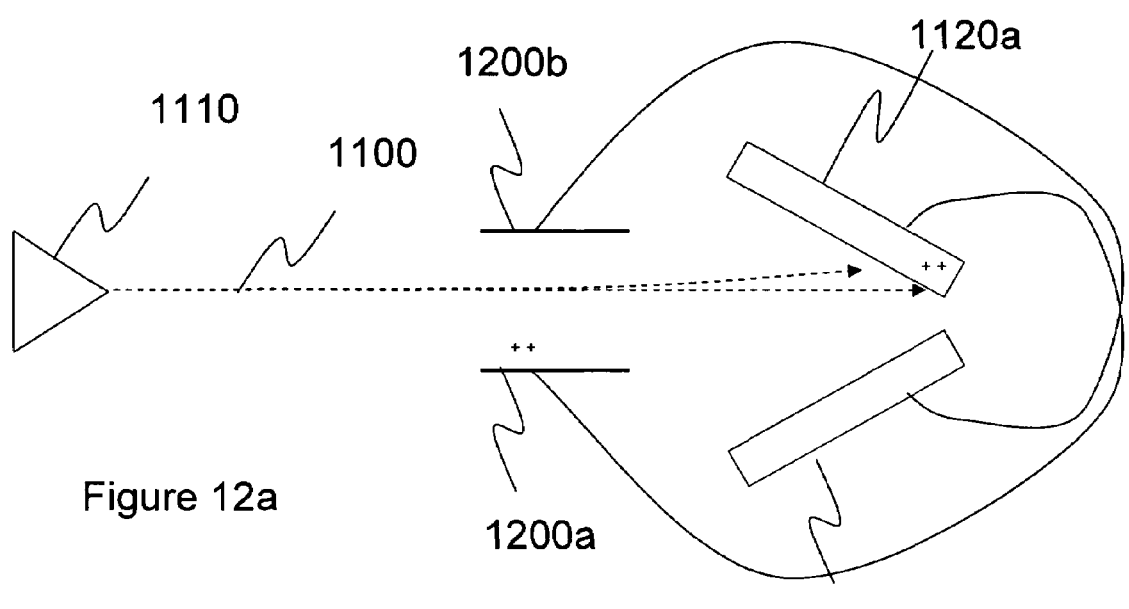
FIGS. 12a-12c represent a pair of electrodes and corresponding cross-coupled deflectors for causing a charged particle beam to oscillate between the pair of electrodes and to periodically emit charged particle from between the electrodes.
Figure 12B:
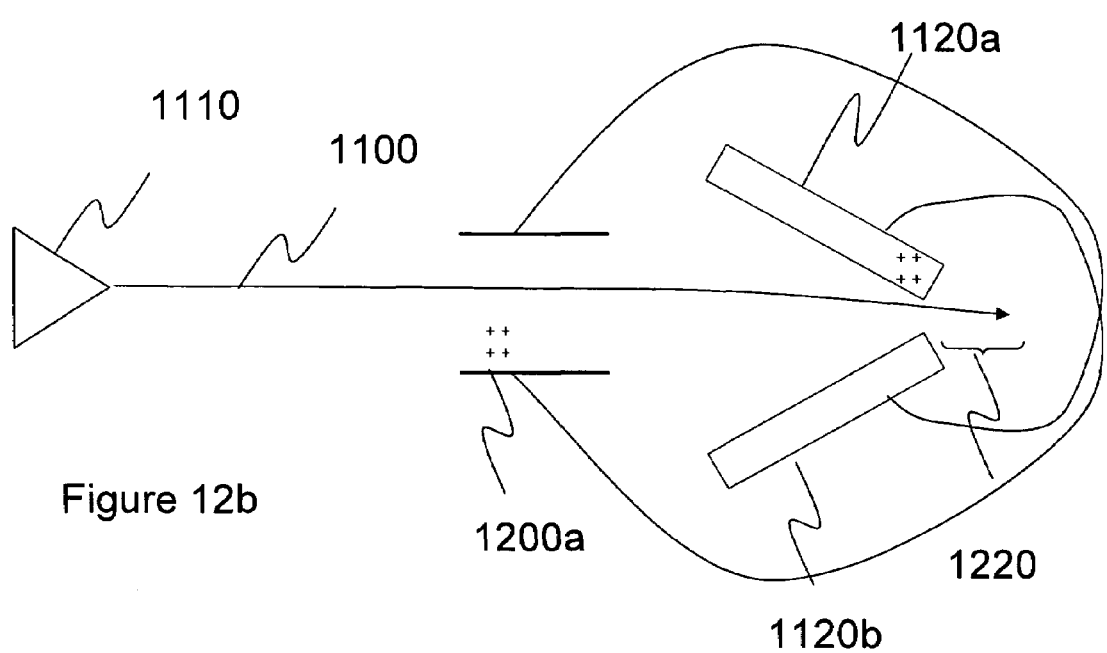
Figure 12C:
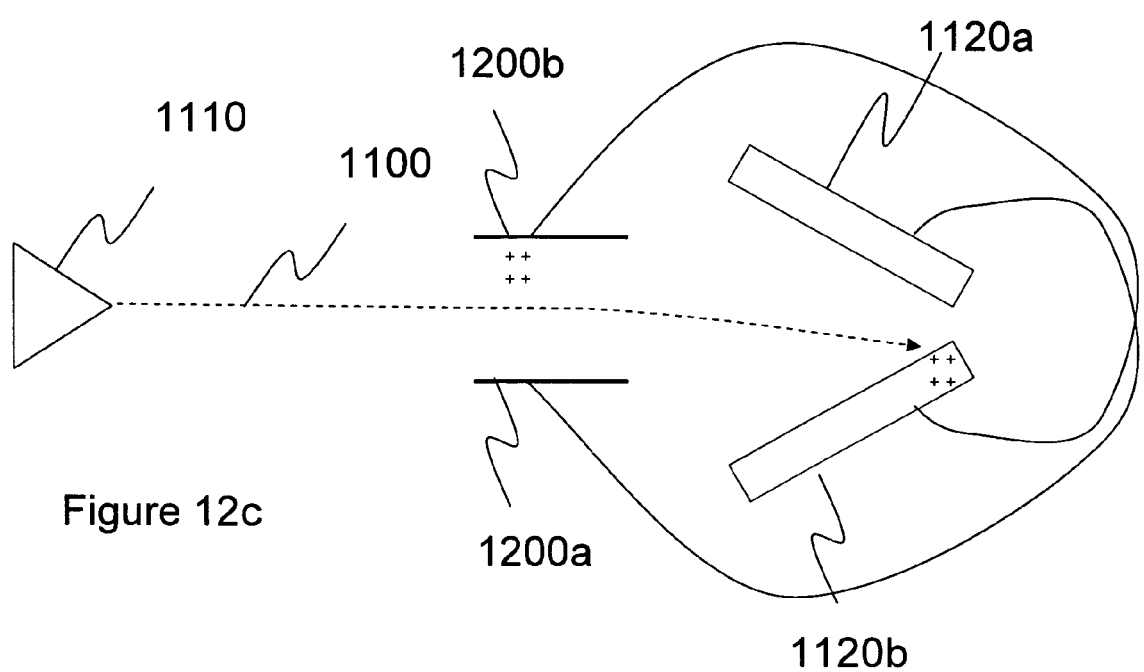

In the embodiment shown in FIGS. 12a-12c, the electrodes of FIGS. 11a and 11b have been separated by a distance sufficient to allow charged particles to pass between them, as shown by the solid line in FIG. 12b. In addition, the electrodes 1120a/b therein are constructed from a material with a SEY>1, and a pair of deflectors 1200a/b are added that are electrically connected to the electrodes. (The corresponding circuits 1130a and 1130b have been omitted from FIGS. 12a-12c for clarity.) The deflectors 1200a/b are cross-coupled to the electrodes 1120a/b so that a loss of electrons on the electrode of one side of the beam corresponds to a loss of electrons on the deflector of the opposite side.

As shown in the remaining figures, a dashed line representing the beam is used to indicate any of the possible paths which cause the beam to strike one of the electrodes. A solid line represents any of the possible paths which cause the beam not to strike one of the electrodes.

As shown in FIG. 12a, as an electron beam impacts the first electrode 1120a, electrons are released from first electrode 1120a (potentially with some depositing on the surface of second electrode 1120b). This increases the positive attraction for the electrons on both the first electrode 1120a and on the deflector 1200*a*. In the illustrated embodiment, the electrode 1120*a* is placed in a straight line with the source 1110 such that when there is no deflection the beam begins in a known location. However, it is possible to place the opening between the electrodes 1120*a* and 1120*b* in line with the source 1110 such that the beam goes through the opening when there is no deflection.

As electrons continue to be freed, based on the relative positions of the deflectors and the electrodes, the attraction of the beam to a deflector (e.g., 1200*a*) eventually overcomes the attraction of beam toward the opposite electrode (e.g., 1120*a*) such that the beam 1100 momentarily passes by a position in between the electrodes 1120*a* and 1120*b*, such that the beam of charged particles 1100 exits from between the electrodes 1120*a* and 1120*b* (i.e., the beam of charged particles passing along segment 1220), as shown in FIG. 12*b*.

Then, because of the accumulation of charge on the deflector 1200*a*, the beam continues to be attracted towards the deflector 1200*a* and towards the electrode 1120*b*. Thus, the beam begins to strike the electrode 1120*b*, as shown in FIG. 12*c*. The electrons on the electrode 1120*b* then begin to become depleted, as occurred with respect to electrode 1120*a*. The beam then momentarily again exits between the electrodes until it is later attracted to the first electrode again.

Figure 13A:
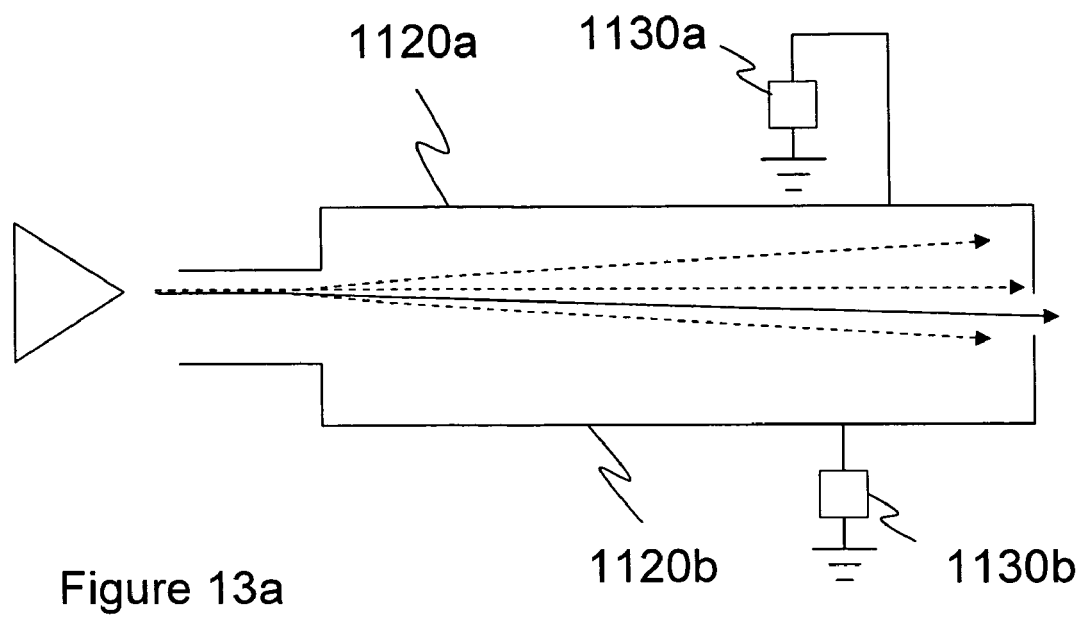
FIGS. 13a-13c represent alternate pairs of electrodes between which a charged particle beam oscillates.

As shown in FIG. 13*a*, in an alternate embodiment, electrodes 1120*a* and 1120*b* are formed with integrated deflectors on the same side as the rest of the corresponding electrode. Initially, in the illustrated embodiment, when there is no deflection caused by (a lack of charge on) the integrated deflectors, the beam contacts a first side (e.g., 1120*a*). As charge accumulates on a first side (e.g., 1120*a*), it causes the accumulated charge on the integrated deflector to repel the beam toward the second side (e.g., toward electrode 1120*b*). As with FIG. 12*b* above and as represented by the solid line, there is a short period of time during which the beam no longer hits the first electrode and instead exits between the electrodes 1120*a/b* before beginning to strike the second side. Later, as charge has accumulated on the second side (e.g., 1120*b*) for a sufficient period of time, and as previously accumulated charge has dissipated through the circuit (e.g., 1130*a*) on the first side, the beam again exits from between the electrodes 1120*a/b* before being deflected toward the first side. Thus, the alternating attraction causes the beam to exit from between the electrodes in a regular or nearly-regular cycle.

Figure 13B:
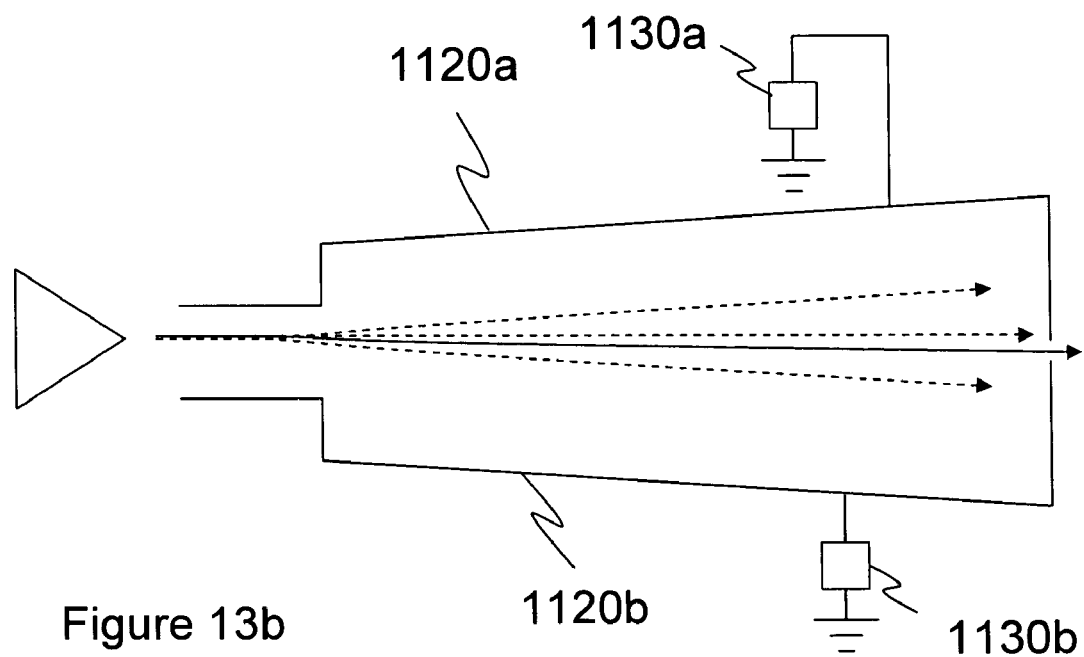

Alternatively, as shown in FIG. 13*b*, other shapes of electrodes can be used without departing from the teachings herein. Furthermore, as shown in FIG. 13*c*, the electrodes can be supplemented with charge collecting structures 1370 that are configured to reduce the number of charged particles, released from the surface of a first electrode, that reach the second electrode, and vice versa.

Figure 13C:
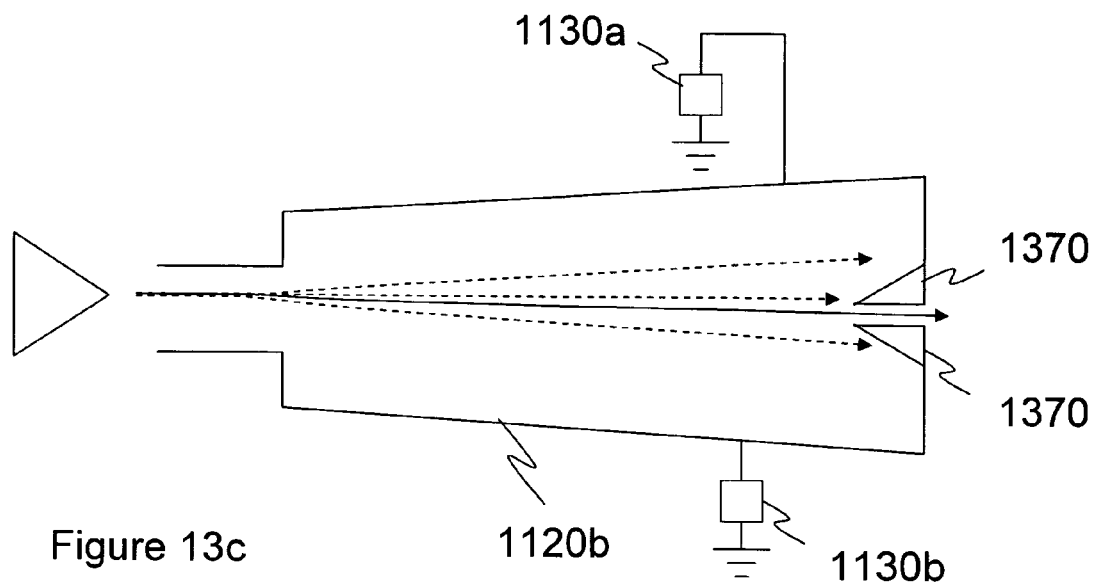
Figure 13D:
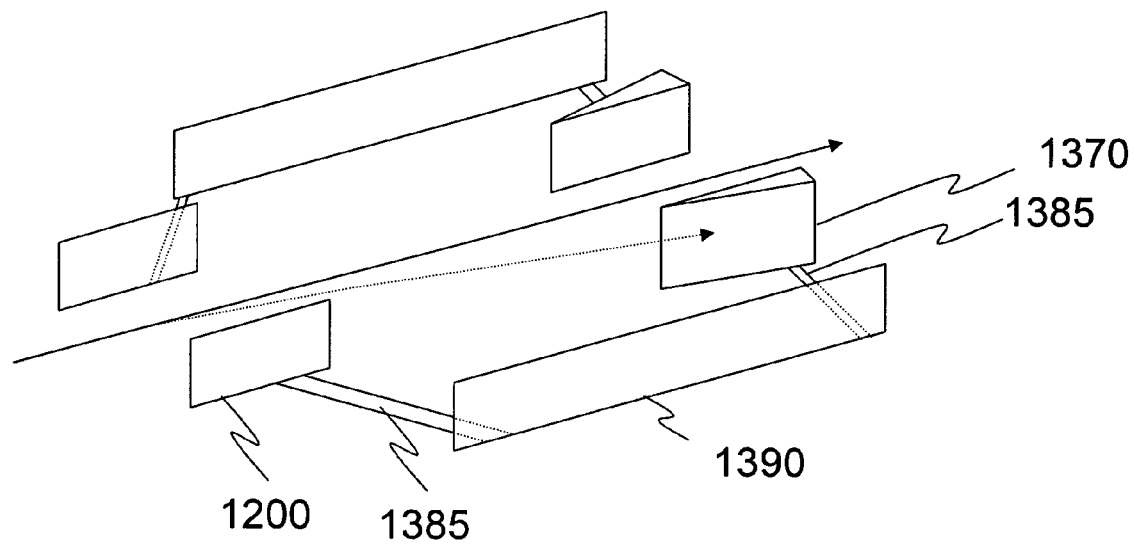
FIG. 13d represents a perspective view of an embodiment of electrodes that include segments of varying heights.

As shown in FIG. 13*d*, the heights of the various segments that make up the electrode (and integrated deflector) need not be all the same. Instead, a portion of the electrode (such as the charge collecting structure 1370) may have a first height but be connected to a second segment (e.g., 1385) which has minimal height (e.g., just enough to act as an electrical conduit between the collecting structure 1370 and the sidewall 1390 of the electrode). The electrode may further have another segment of minimal height (or reduced height compared to the charge collecting structure 1370 and/or the sidewall 1390) which connects to the deflector 1200. Alternatively, the sidewall may be a different height than the collecting structure 1370, such as larger or smaller (e.g., approximately the same size as the segments 1385). For segments 1385, an additional shielding may be used above those segments (or portions of those segments) to reduce the deflection effect of the segments on the beam.

Figure 14A:
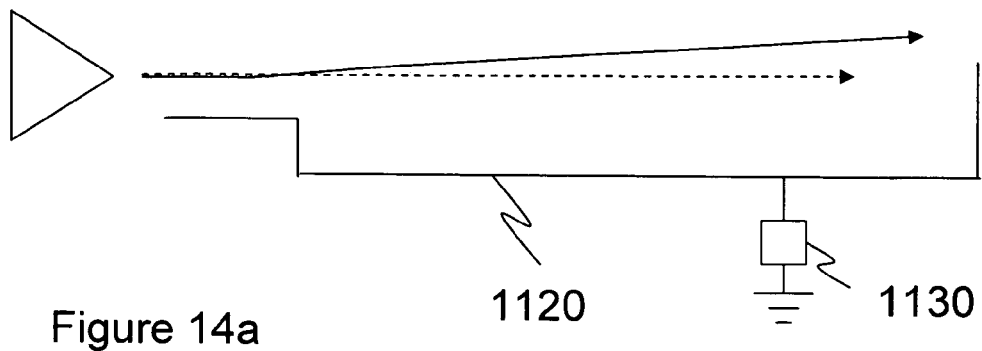
FIGS. 14a and 14b represent a single electrode forming a pulsed charged particle beam, without and with a focusing element, respectively.
Figure 14B:
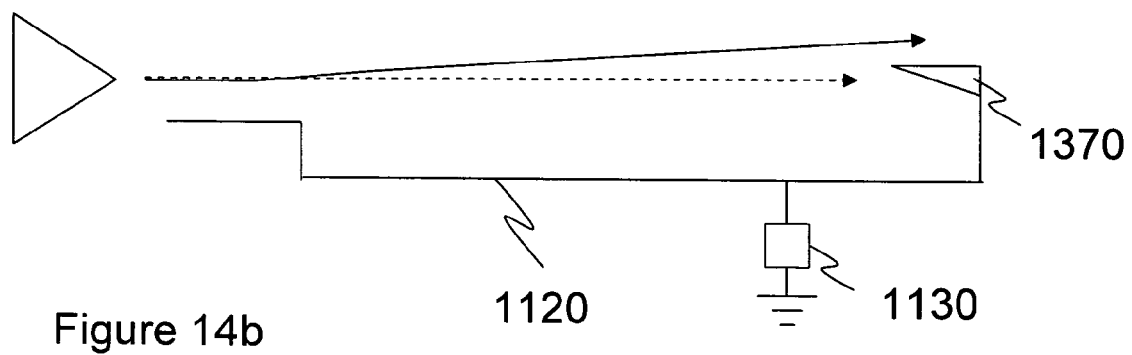
Figure 14C:
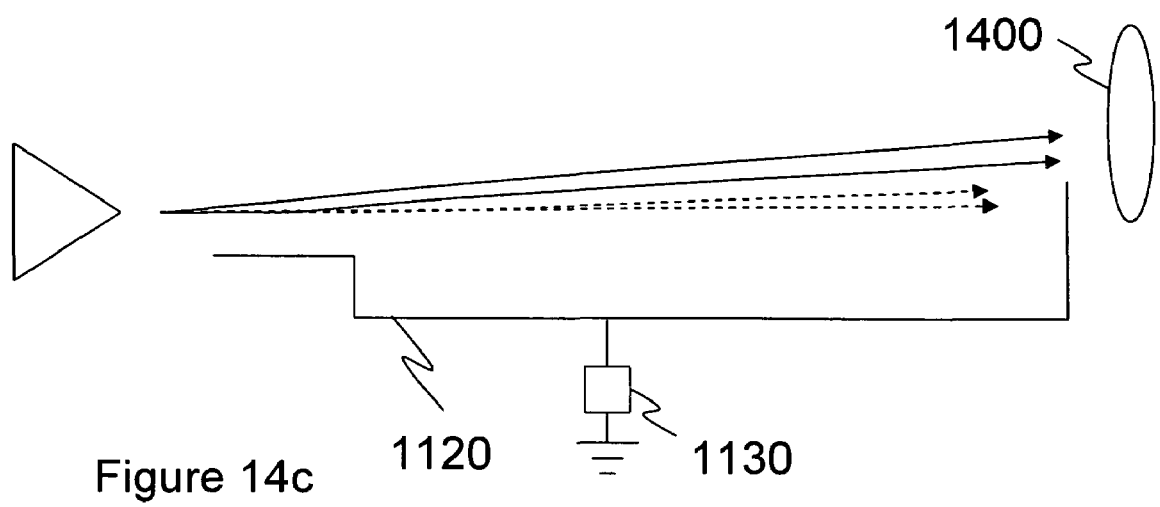
FIG. 14c represents a single electrode forming a pulsed charged particle beam in combination with a focusing element.

The configuration of structures such as shown in FIGS. 13*a*-13*c* can be modified as shown in FIGS. 14*a*-14*c*. In the embodiment of FIG. 14*a*, one of the two electrodes used in FIGS. 13*a*-13*c* is removed, and the oscillator instead relies on the circuit 1130 to remove charge after the beam no longer strikes the electrode 1120, but without the help of an opposite electrode or deflector. This reduces the complexity of the oscillator. In the embodiment of FIG. 14*b*, a charge collecting structure 1370 has been included to help control the spread of charges released from the surface of the electrode 1120.

In the alternate structure illustrated in FIG. 14*c*, a focusing element 1400 has been added to the oscillator to direct the beam when the beam no longer hits the electrode 1120. This improves the consistency of the path taken by the beam when the beam no longer hits the electrode 1120.

Figure 15A:
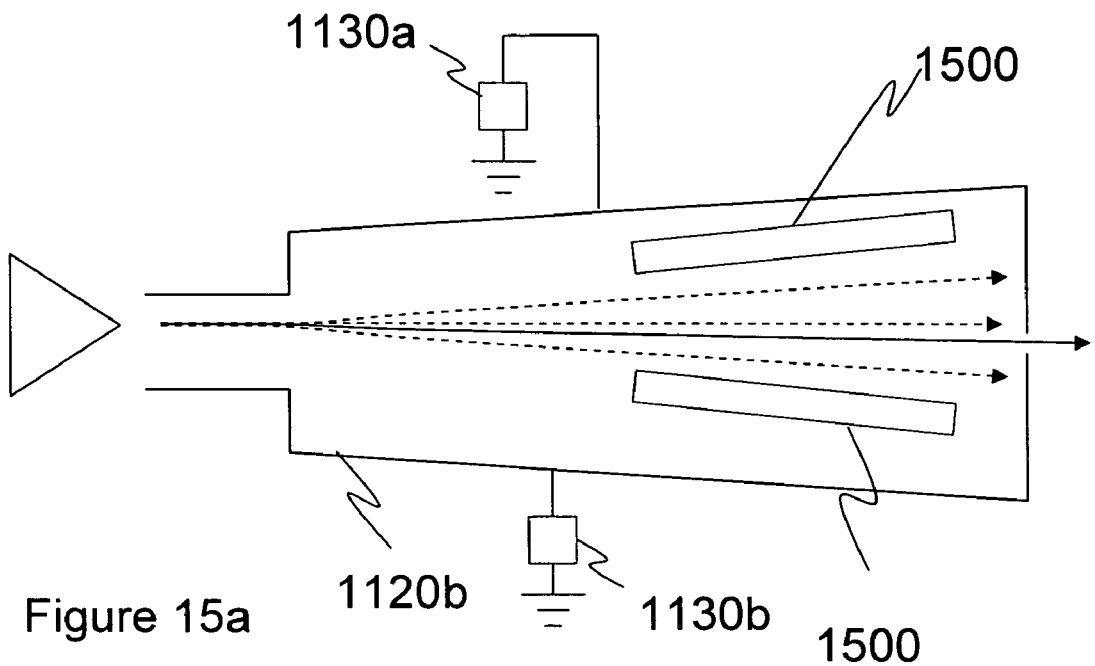
FIG. 15a represents a pairs of electrodes between which a charged particle beam oscillates where the oscillating beam causes at least one resonant structure to periodically resonate.

In an alternate structure, as shown in FIG. 15*a*, one or more resonant structures 1500 can be placed such that the charged particle beam causes at least one of the resonant structures 1500 to resonate when the beam is at a given deflection (which is intended to include a range of possible deflections). For example, as shown, two resonant structures 1500 are placed such that when the beam is at or near a maximum deflection the resonant structures 1500 are caused to resonate.

Figure 15B:
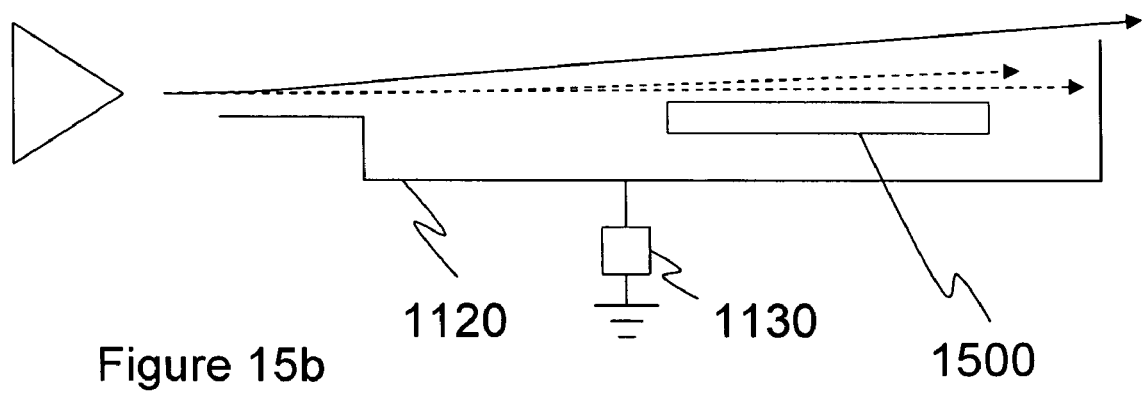
FIGS. 15b-15d represent an electrode which causes a charged particle beam to oscillate such that at least one resonant structure periodically resonates.

As shown in FIG. 15*b*, the resonant structures 1500 need not be used in pairs. Instead, a single electrode 1120 can be used (e.g., with an integrated deflector). As a sufficient amount of charge accumulates on the electrode 1120, the beam is deflected away from the resonant structure a distance sufficient to cause the beam to no longer contact the electrode 1120. (The beam may then be caught in a device such as a Faraday cup or may be allowed to continue on to act as a beam for another device, as is described in more detail below.) When the circuit 1130 has drained off the accumulated charge on the electrode 1120 sufficiently, the beam is less deflected such that the beam again induces resonance in the resonant structure 1500.

Figure 15C:
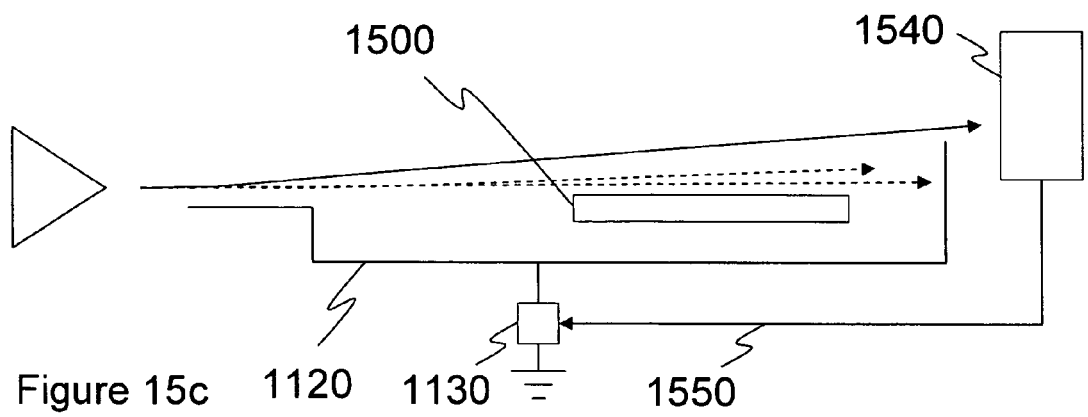

In yet another embodiment illustrated in FIG. 15*c*, the structure of FIG. 15*b* is supplemented with a detector 1540 and a control line 1550 that couples to the circuit 1130. In this configuration, when the detector 1540 detects that the beam has been deflected away from the electrode 1120, the detector 1540 generates a control signal on the control line 1550 that causes the circuit 1130 to alter the rate at which the accumulated charge on the electrode 1120 is removed. The control signal may cause a greater or lower rate of charge removal. For example, the circuit 1130 may drain very little charge while the detector 1540 does not detect the beam, but the circuit 1130 may have a high drain rate when the detector 1540 does detect the beam.

Figure 15D:
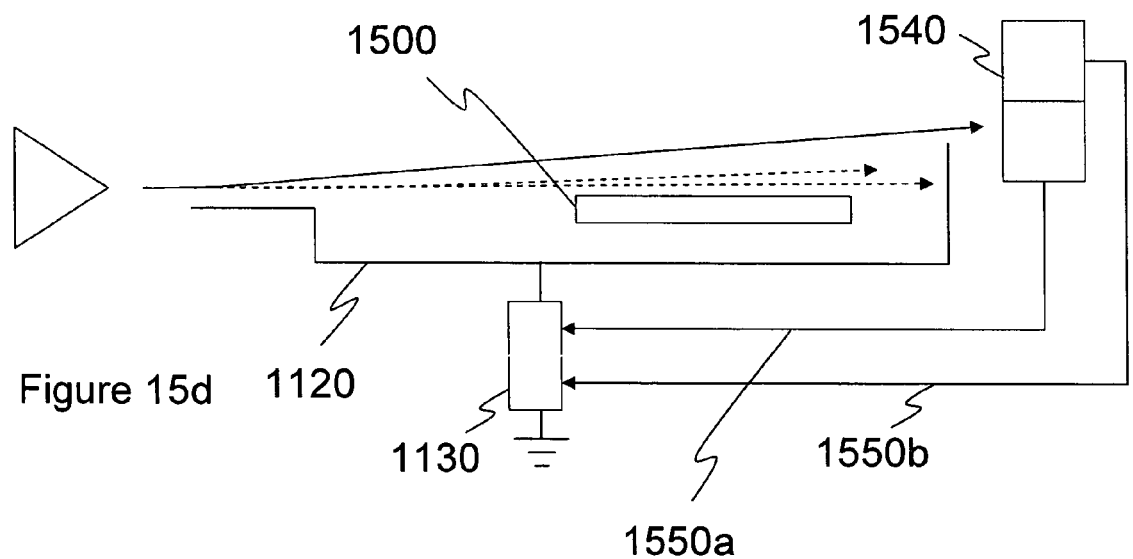

As shown in FIG. 15*d*, it is also possible to use multiple detectors 1540 or a detector 1540 that detects the presence of the beam in multiple locations. In such a configuration, plural control lines 1550 can provide control signals to the circuit 1130 to enable the circuit 1130 to perform deflection-specific control of the rate of charge drain.

Figure 16A:
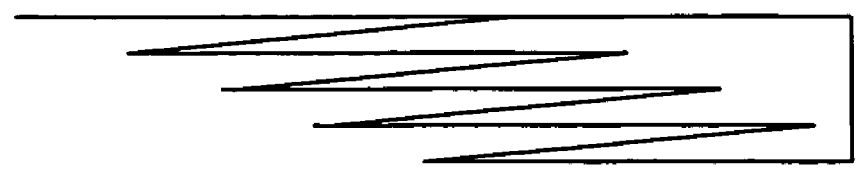
FIGS. 16a and 16b represent additional exemplary designs of electrodes.
Figure 16B:
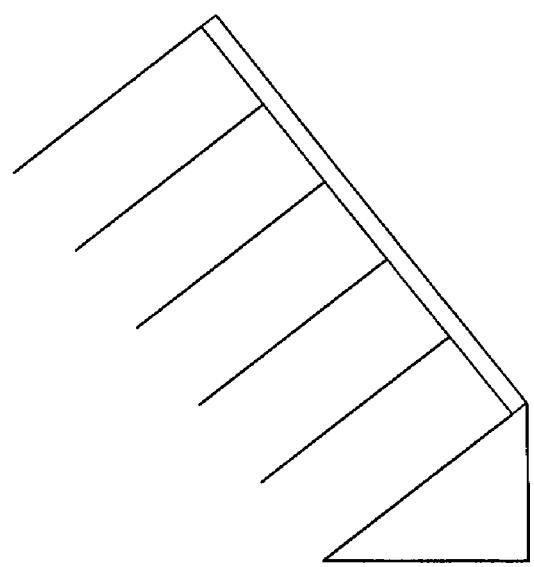

Additional exemplary shapes for electrodes 1120 are shown in FIGS. 16*a* and 16*b*. Such designs may aid in the reabsorption of charged particles on the surface of the electrode 1120 when the surface of the electrode 1120 is hit by the charged particle beam.

On use of a beam that exists between electrodes 1120*a/b* is to create a pulsed charged-particle beam can be used to excite one of the resonant structures described above or can be used as a pre-bunching element 800. One possible use of such a pulsed charged-particle beam is as an input to a structure that produces coherent light to drive a Raman laser. By using the pulsed charged-particle beam, the Raman laser can be driven in a pulsed, as opposed to continuous, fashion.

As would be understood by one of ordinary skill in the art, the above exemplary embodiments are meant as examples only and not as limiting disclosures. Accordingly, there may be alternate embodiments other than those described above which nonetheless still fall within the scope of the pending claims.

The invention claimed is:

1. An oscillator, comprising:
a source of charged particles for generating a beam of charged particles;
a first electrode which selectively receives the beam of charged particles;
a first deflector electrically coupled to the first electrode; and
a charged particle removing circuit electrically connected to at least one of the first electrode and the first deflector and configured to remove charged particles from at least one of the first electrode and the first deflector at least when the first electrode is not receiving the beam of charged particles, wherein an accumulation of charge on the first electrode causes the beam of charged particles to be directed away from the first electrode by the first deflector.

2. The oscillator as claimed in claim 1, wherein the charged particles comprise electrons and the accumulation of charge on the first electrode is an accumulation of a negative charge.

3. The oscillator as claimed in claim 1, wherein the first deflector and the first electrode are on the same side of the beam of charged particles with reference to a direction of travel of the beam of charged particles.

4. The oscillator as claimed in claim 1, further comprising a focusing element for receiving the beam of charged particles when the beam of charged particles is not being received by the first electrode.

5. The oscillator as claimed in claim 1, further comprising:
a second electrode; and
a second deflector, wherein the first deflector and the first electrode are on the same side of the beam of charged particles with reference to a direction of travel of the beam of charged particles, and the second deflector and the second electrode are on a different side of the beam of charged particles with reference to the direction of travel of the beam of charged particles.

6. An oscillator, comprising:
a source of charged particles for generating a beam of charged particles; and
first and second electrodes disposed in a direction of travel of the beam of charged particles, wherein an accumulation of charge on the first electrode causes the beam of charged particles to be directed towards the second electrode and vice versa such that the beam of charged particles oscillates between the first and second electrodes; and
a charged particle removing circuit electrically connected to at least one of the first and second electrodes and configured to remove charged particles from the at least one of the first and second electrodes when said beam of charged particles is not directed towards said at least one of the first and second electrodes.

7. The oscillator as claimed in claim 6, wherein the charged particles comprise electrons and the accumulation of charge on the first electrode is an accumulation of a negative charge.

8. The oscillator as claimed in claim 6, further comprising first and second deflectors interposed between the source of charged particles and the first and second electrodes,
wherein the first deflector is coupled to the second electrode and the second deflector is connected to the first electrode, and
wherein the accumulation of charge on the first electrode is an accumulation of a positive charge and causes an accumulation of positive charge on the second deflector.

9. The oscillator as claimed in claim 6, wherein the first and second electrodes are separated by a gap through which a portion of the beam of charged particles can periodically pass as the beam of charged particles oscillates.

10. The oscillator as claimed in claim 6, further comprising first and second deflectors interposed between the source of charged particles and the first and second electrodes,
wherein the first deflector is coupled to the first electrode and the second deflector is connected to the second electrode, and
wherein the accumulation of charge on the first electrode is an accumulation of a negative charge and causes an accumulation of negative charge on the first deflector.

* * * * *